United States Patent [19]

Cox et al.

[11] Patent Number: 5,034,967
[45] Date of Patent: Jul. 23, 1991

[54] METASTABLE-FREE DIGITAL SYNCHRONIZER WITH LOW PHASE ERROR

[75] Inventors: William M. Cox; Michael A. Fischer, both of San Antonio, Tex.

[73] Assignee: Datapoint Corporation, San Antonio, Tex.

[21] Appl. No.: 285,206

[22] Filed: Dec. 16, 1988

Related U.S. Application Data

[63] Continuation-in-part of Ser. No. 270,739, Nov. 14, 1988.

[51] Int. Cl.$^5$ ............................................. H04L 7/033
[52] U.S. Cl. ..................................... 375/119; 375/110; 375/118; 328/72
[58] Field of Search ............... 375/119, 118, 113, 110, 375/111, 106; 328/72; 340/825.2; 370/105.3, 108

[56] References Cited

U.S. PATENT DOCUMENTS

| | | | |
|---|---|---|---|
| 3,087,065 | 4/1963 | Mutschler . | |
| 3,337,691 | 8/1967 | Litchman . | |
| 3,482,101 | 12/1969 | Slaymaker . | |
| 3,532,890 | 10/1970 | Denton . | |
| 3,571,756 | 3/1971 | Skoog et al. . | |
| 3,621,139 | 2/1971 | Gibson . | |
| 3,689,699 | 9/1972 | Brenig et al. . | |
| 3,733,550 | 5/1973 | Tazaki et al. . | |
| 3,755,676 | 8/1973 | Kinsel . | |
| 3,775,688 | 11/1973 | Hinoshita et al. . | |
| 3,851,252 | 11/1974 | Karnaugh et al. . | |
| 3,897,887 | 6/1975 | Goldberg . | |
| 3,979,561 | 9/1976 | Hinkle et al. . | |
| 3,985,423 | 10/1976 | Tseng . | |
| 4,062,618 | 12/1977 | Steensma . | |
| 4,101,734 | 7/1978 | Dao . | |
| 4,161,628 | 7/1979 | McRae . | |
| 4,206,320 | 6/1980 | Keasler et al. | 375/102 |
| 4,258,433 | 3/1981 | Herschtal et al. | 370/24 |
| 4,326,289 | 4/1982 | Dickinson | 370/85 |
| 4,339,818 | 7/1982 | Gruenberg | 370/112 |
| 4,348,075 | 9/1982 | Gottlieb et al. | 350/96.13 |
| 4,386,323 | 5/1983 | Jansen | 375/119 |
| 4,451,827 | 5/1984 | Kahn et al. | 340/825.52 |
| 4,534,040 | 8/1985 | Thopar | 375/39 |
| 4,564,003 | 5/1986 | Stahler | 375/42 |
| 4,575,860 | 3/1986 | Scordo | 375/119 |
| 4,597,090 | 6/1986 | Forney, Jr. | 375/39 |
| 4,599,732 | 7/1986 | Le Fever | 375/13 |
| 4,602,365 | 7/1986 | White et al. | 370/89 |
| 4,649,535 | 3/1987 | Ulug | 370/86 |
| 4,675,671 | 10/1987 | Ishizuka et al. | 340/825.05 |
| 4,675,880 | 6/1987 | Davarin | 375/39 |
| 4,700,185 | 10/1987 | Balph et al. | 340/825.26 |
| 4,701,905 | 12/1987 | Un et al. | 375/96 |
| 4,701,908 | 10/1987 | Ikeda | 370/85 |
| 4,713,817 | 12/1987 | Wei | 371/43 |
| 4,752,924 | 6/1988 | Darnell et al. | 370/86 |
| 4,756,007 | 7/1988 | Qureshi et al. | 375/37 |
| 4,757,497 | 7/1988 | Beierle et al. | 370/89 |
| 4,771,286 | 9/1988 | Niessen et al. | 340/825.52 |
| 4,780,889 | 10/1988 | Ley et al. | 375/106 |
| 4,782,482 | 11/1988 | Kiatipor et al. | 370/86 |
| 4,789,982 | 12/1988 | Coden | 370/85 |
| 4,792,944 | 12/1988 | Takahashi et al. | 370/84 |
| 4,797,879 | 1/1989 | Habbab et al. | 370/3 |
| 4,821,296 | 4/1989 | Cordell | 375/119 |
| 4,841,551 | 6/1989 | Avaneas | 375/118 |
| 4,855,997 | 8/1989 | Wilson et al. | 370/85 |
| 4,896,338 | 1/1990 | Rouillet et al. | 375/119 |
| 4,907,224 | 3/1990 | Scoles et al. | 370/85.2 |

OTHER PUBLICATIONS

800 MB/s PCM Multilevel Transmission System over Coaxial Cables by Aratoni & Fukinuki.

Excerpt of Chapter 2 from "A Commonsense Approach to the Theory of Error Correcting Codes", Benjamin Arazi, The MIT Press, 1988.

Excerpt from "Error Detecting Codes, Self-Checking Circuits and Applications", by John Wakerly, 1982.

Excerpt of "Microcomputer Interfacing" by Harold S. Stone, 1983.

Excerpt from "Circuits and Application Seminar" by Fairchild pertaining to Data Synchronizer, published 1982.

"Anomalous Behavior of Synchronizer and Arbiter Circuits" by Thomas J. Chaney and Charles E. Molnar published in an unknown publication.

Article "Designers Confront Metastability in Boards and Buses", by John Beaston and R. Scott Tetrick, *Computer Design*, Mar. 1, 1986.

5,034,967

Page 2

*Primary Examiner*—Douglas W. Olms
*Assistant Examiner*—Ralph Smith
*Attorney, Agent, or Firm*—John R. Ley

[57] ABSTRACT

An output clock signal is synchronized with predetermined phase accuracy relative to an internal stable frequency reference clock signal upon the application of a transition of an asynchronous event signal. A plurality of phase shifted versions of the reference clock signal are derived. Upon the occurrence of the asynchronous signal, the states of the phase shifted versions are sampled, and that information is utilized as a code to select one of the phase shifted versions from which the output clock signal is derived. Synchronization occurs rapidly within the metastable settling time of the flip-flops of a register which sample or decode the states of the phase shifted versions, or by logical gating arrangements which avoid the necessity for considering the metastable signal. Synchronization is typically obtainable in less than the period of one reference clock signal.

57 Claims, 8 Drawing Sheets

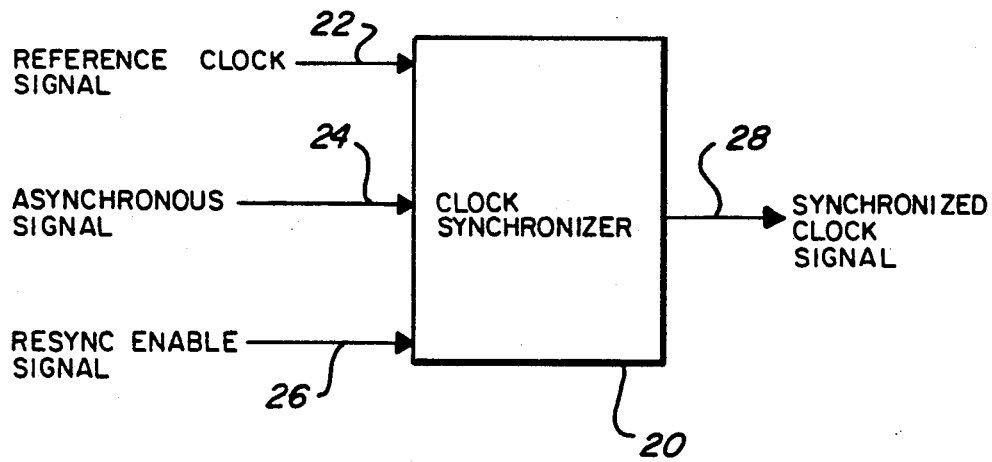
Fig_1
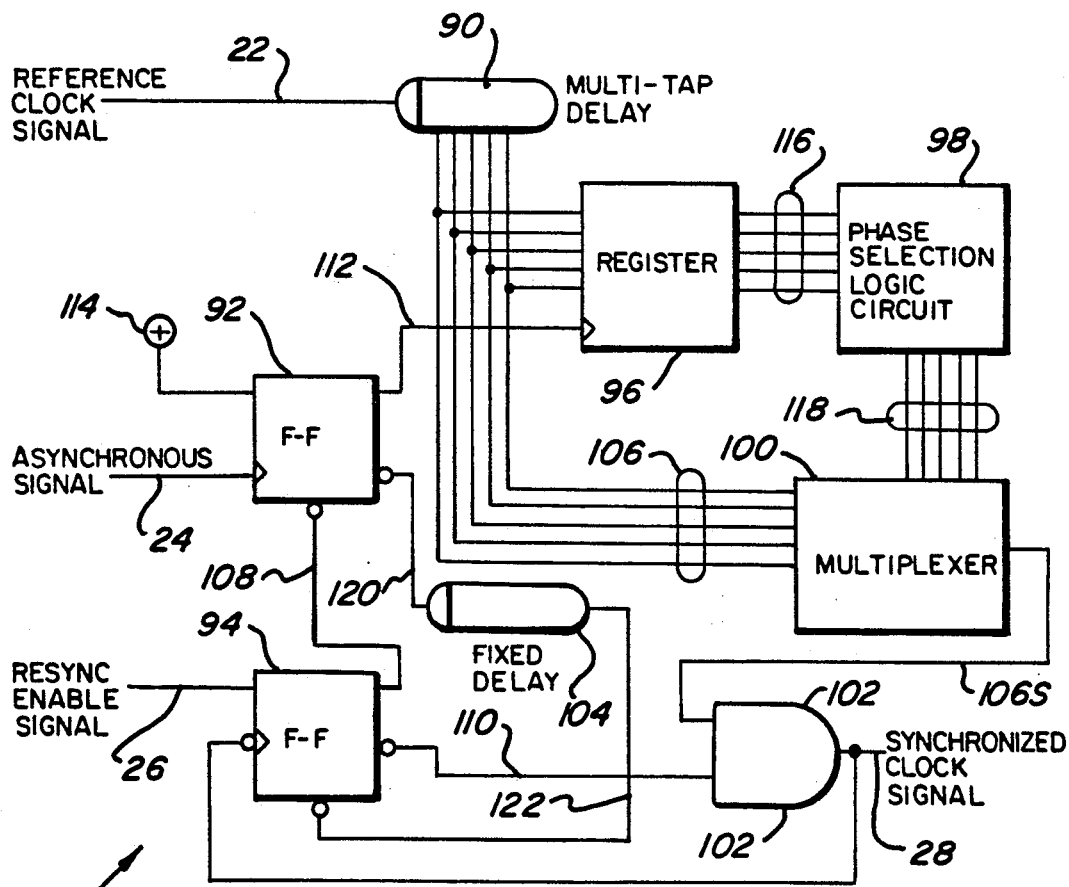
Fig_3

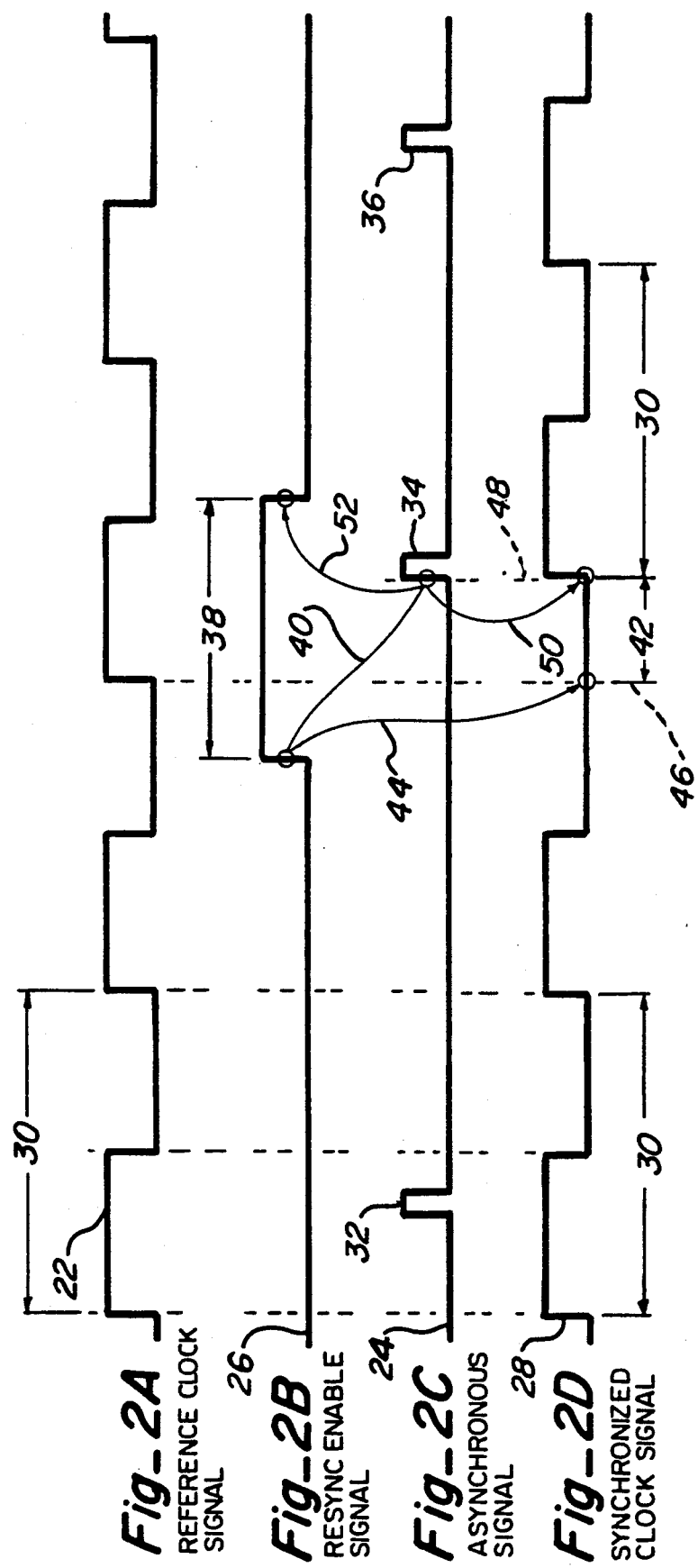

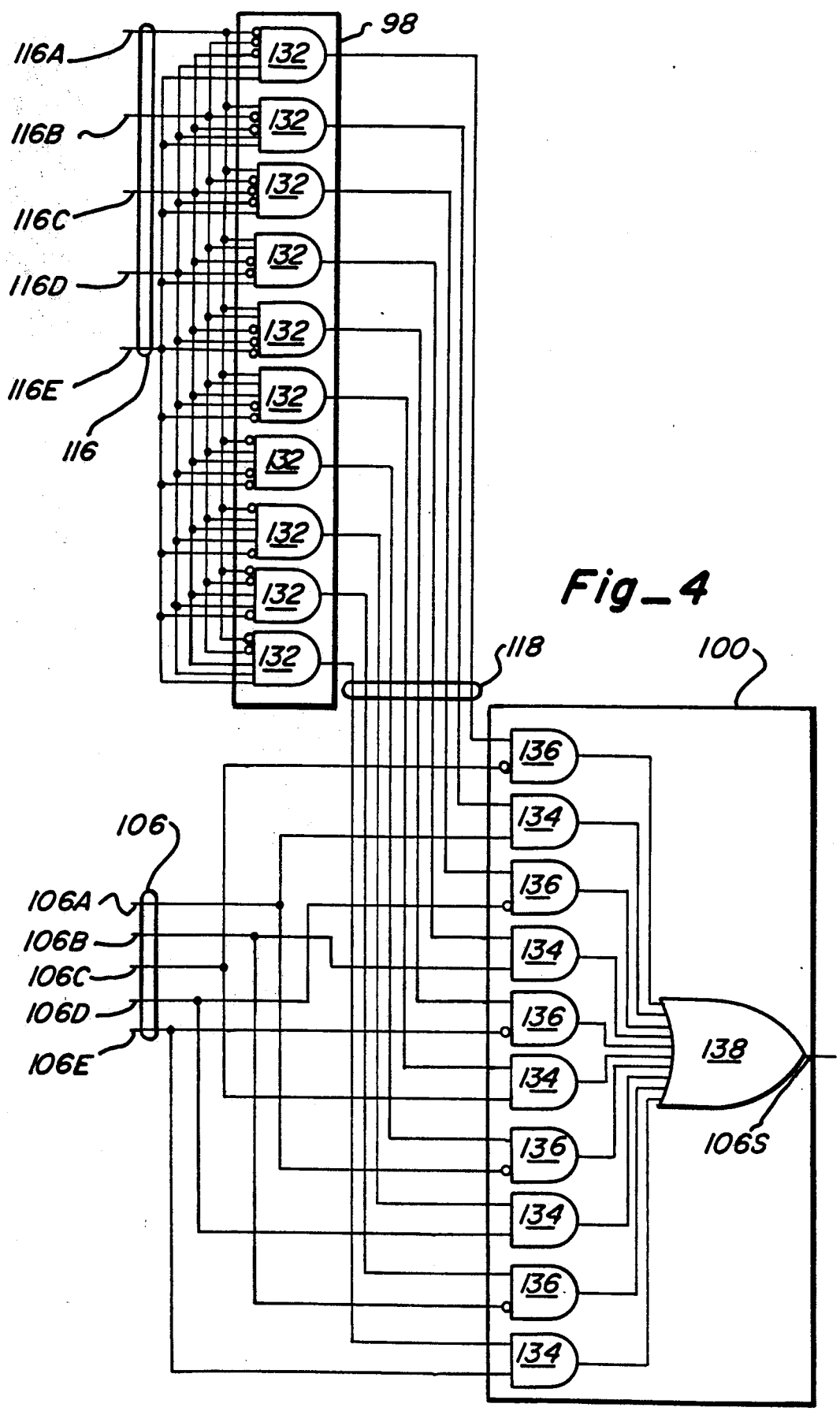
Fig_4

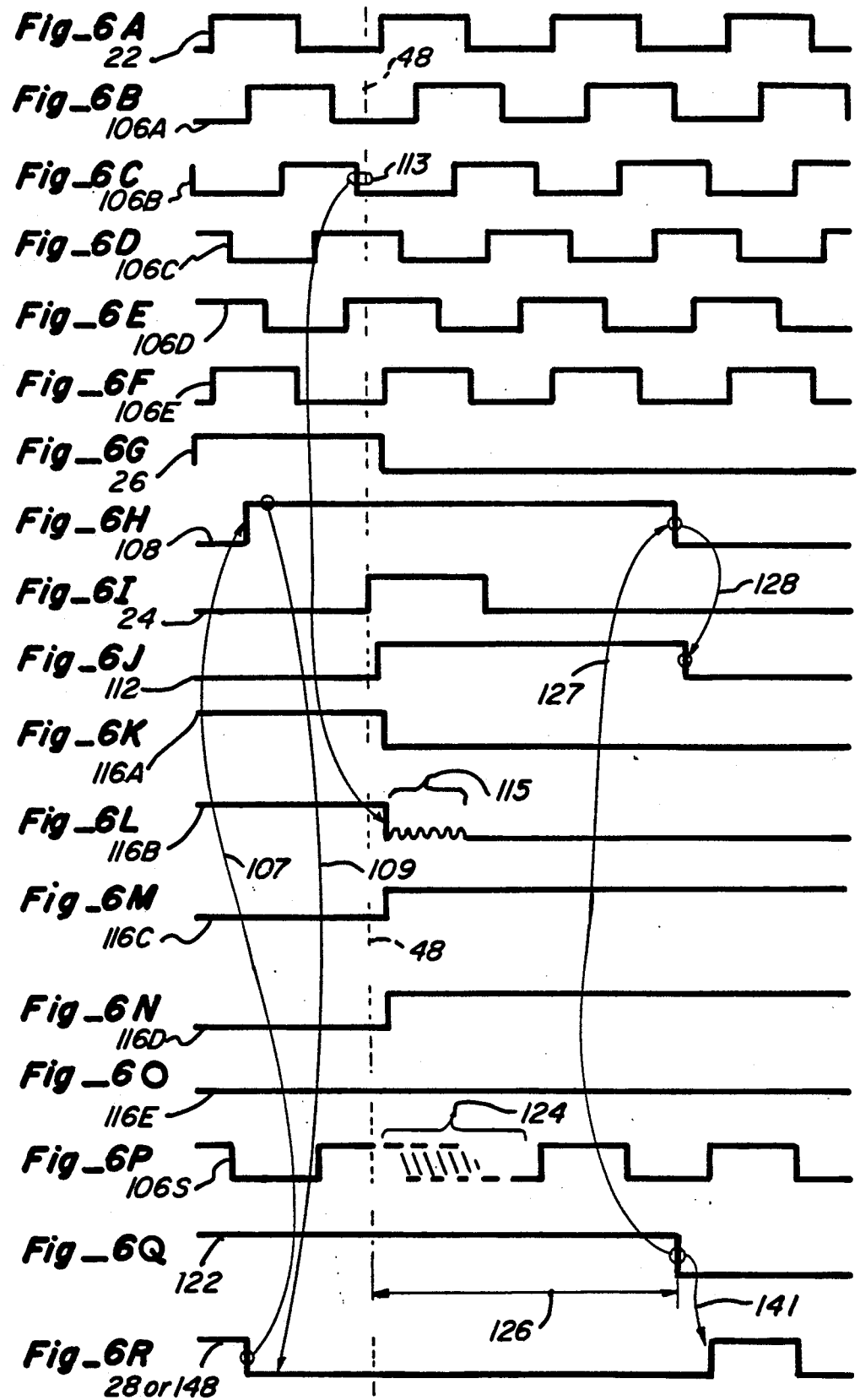

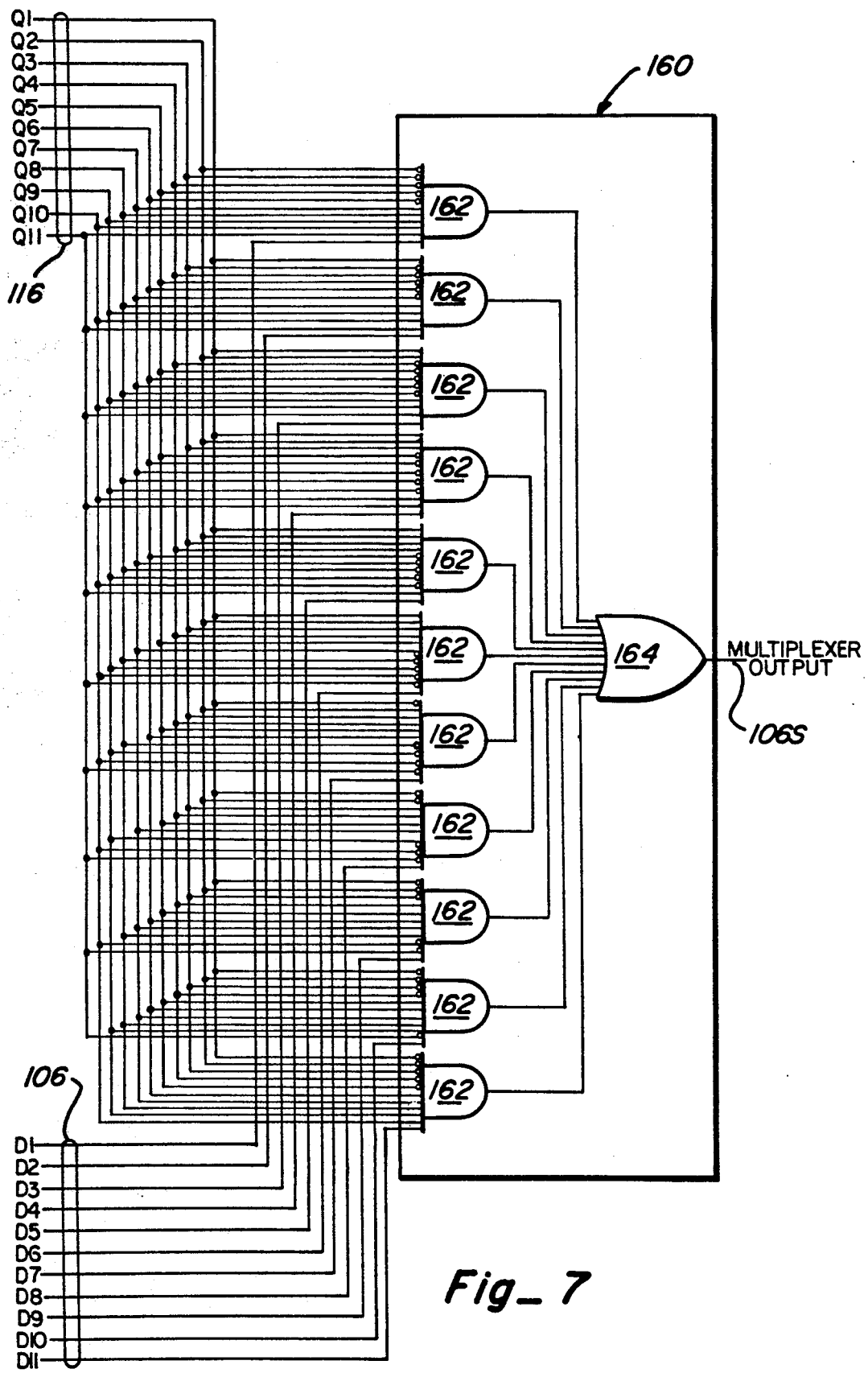
Fig_7

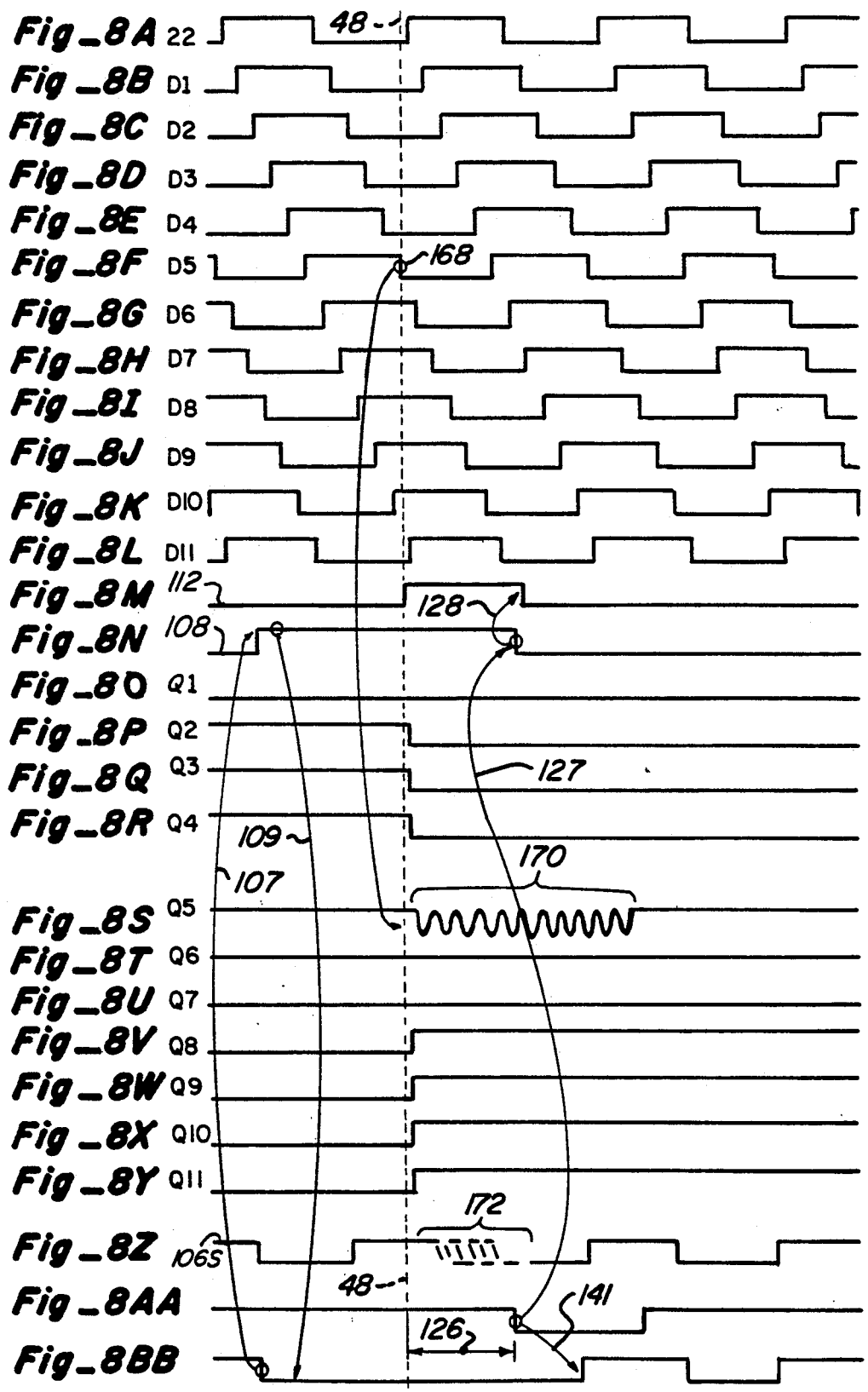

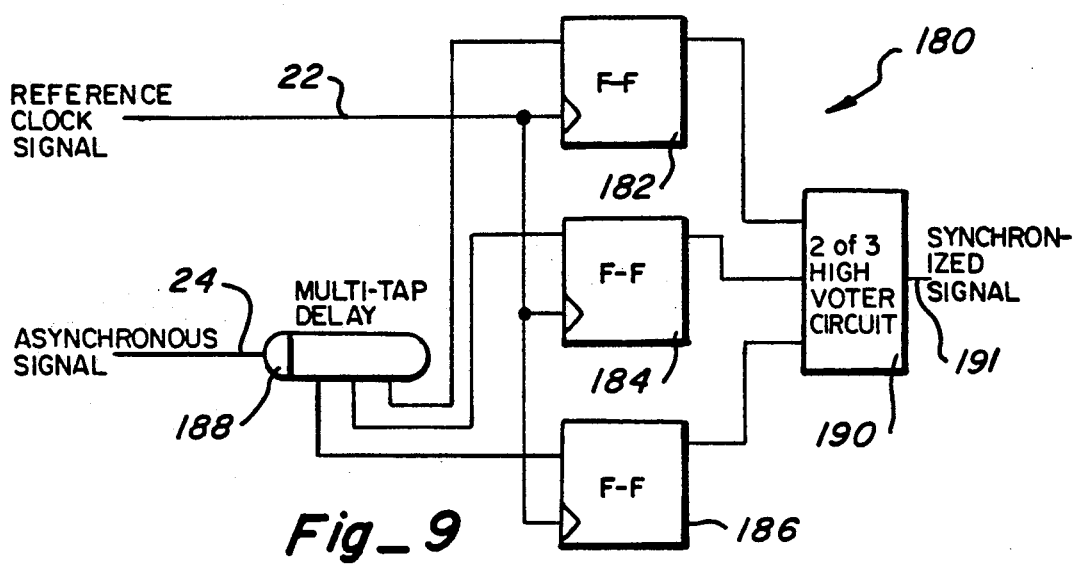
Fig_9
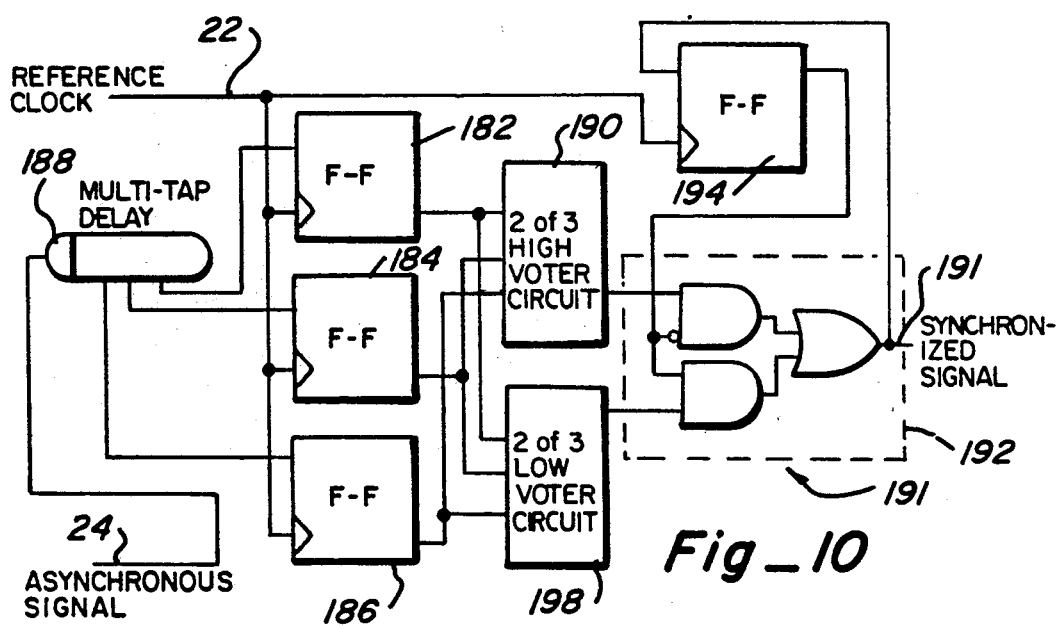
Fig_10
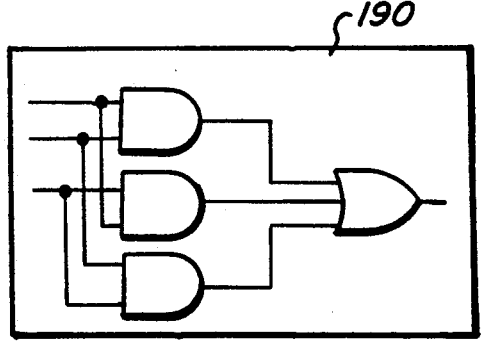
Fig_11
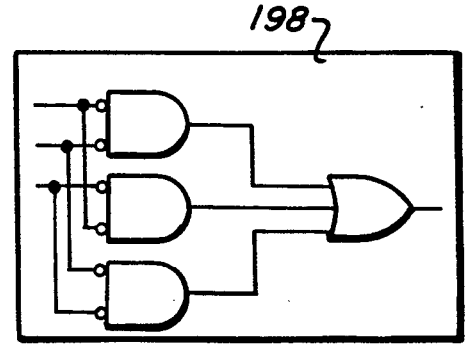
Fig_12

METASTABLE-FREE DIGITAL SYNCHRONIZER WITH LOW PHASE ERROR

CROSS-REFERENCE TO RELATED APPLICATION

This is a continuation-in part of United States application Ser. No. 270,739, filed Nov. 14, 1988, for MULTI-BIT AMPLITUDE AND PHASE MODULATION TRANSCEIVER FOR LAN, which is assigned to the assignee hereof.

BACKGROUND OF THE INVENTION

The present invention relates to synchronizers, and more particularly to a new and improved technique, capable of all-digital implementation, of rapidly synchronizing a clock signal with an asynchronous event defined by a signal transition (e.g. edge) of an external asynchronous signal.

Synchronizers find widespread applicability in a variety of interface environments where complete time base synchronization cannot be maintained throughout the whole system. A typical example is in a computer system which must receive a data stream of known frequency from an external device which operates from its own, independent timebase To properly recover the data, an I/O interface of the computer system must be able to sample the incoming signals in phase with the signal transitions generated by the external device. Properly sampling the signals requires that the I/O interface synchronize a sampling clock signal to be in phase with the received data stream for the duration of the transmission from the external device to the I/O interface.

Examples of I/O interfaces which usually employ clock synchronizers include magnetic media read channels (disk drives, diskette drives, tape drives, etc.), local area network receivers, wide area network serial receivers including satellite and microwave communication links and broadband and fiber optic cable links, and mechanical scanner interfaces (card readers, bar code readers, badge readers, optical recognition scanners, etc.). In some cases clock synchronizers are called "clock recovery circuits". In magnetic media read channels, the circuits referred to as "data separators" generally include a clock synchronizer.

Clock synchronizers are needed in physically distributed synchronized communication systems, such as synchronous modems communicating over a telephone network or token ring local area networks. In such physically distributed environments it is not possible to use a physically common clock among all points and components of the communication system. The transmitters and receivers are maintained in synchronism by signals communicated over the communication medium. The traditional techniques for implementing this synchronization involve using phase-locked loops, self-clocking codes, and/or resynchable oscillators.

Phase-locked loops recover the transmission clock signal from the received data stream. However, most phase-locked loop synchronizers require a number of cycles of the received signal before the proper frequency and phase characteristics can be established. A somewhat lengthy preamble must be inserted at the beginning of each data block or signal stream, in order to supply the necessary signals to achieve synchronization before the presentation of the data. Since the preamble does not contain useful data, the time required to transfer the preamble reduces the efficiency of communication. An example of this situation is a well known local area network, which uses a phase-locked loop for clock recovery and requires a 64-bit preamble at the beginning of every frame of data communicated in order to establish synchronization.

The fundamental characteristic of a phase-locked loop is that it can be optimized for capture range, that is, the amount of error in the input frequency which can be tolerated, or it can be optimized for phase accuracy, but it cannot be optimized for both simultaneously. Where very accurate data clocking is required, a direct and unavoidable side effect of using a phase-locked loop is the need for the relatively lengthy preamble and/or some means to limit the possible input frequency variation. Where rapid synchronization or loop lock-on is required, extreme accuracy cannot be achieved In addition, most synchronizers employing phase-locked loops require calibration, at least during manufacture and often during use, due to the use of tuned analog components in the phase locked loop. Digital phase-locked loops are known, but digital phase locked loops generally require reference clocks of many times the frequency of the signal stream in order to work effectively. High speed reference clocks can make synchronizers using digital phase locked loops prohibitively expensive for data communication rates over approximately 1 MHz.

Most self-clocking codes are actually codes which have a frequency component which can be used as an input signal to a phase-locked loop for clock recovery. Such codes, including the widely used Manchester code, suffer from the disadvantages associated with phase locked loops discussed above. Some self-clocking codes, including biphase and pulse width modulation, can be decoded in certain cases without using phase-locked loops but are restricted to lower data communication rates and much poorer data throughput efficiencies.

In resynchable oscillator systems, an oscillator is started in phase with the beginning of an incoming signal stream. It is expected that the oscillator starts at a selected point with, and remains in phase while, the incoming signal stream is received. The oscillator is then resynchronized for each subsequent signal stream or data block. In cases where accurate timing tolerances are not required this approach is acceptable, but the cost, manufacturability difficulties, and limited accuracy of this approach makes it undesirable when high data rates, or high clock accuracy, are required. Because stable frequency reference clocks, such as crystal oscillator circuits, cannot be arbitrarily resynchronized, resynchable oscillators cannot employ a stable frequency reference. As a result, the fundamental output frequency of a resynchable oscillator tends to drift as a result of variations in temperature and voltage, which requires periodic recalibration during system operation.

A form of a synchronizer is also employed in systems where it is desired to derive a synchronized clock output signal from an asynchronous event signal, but it is unnecessary or not required to establish or preserve the relative phase information between the synchronized clock output signal and the asynchronous event signal. The primary application for such a synchronizer is to eliminate the possibility of creating a metastable condition in the sampled output signal employed by the synchronous system and thereby avoid a situation where data sampling will be unreliable due to the metastability.

Dual rank flip-flop synchronizers are typically used to avoid metastability when it is unnecessary to preserve the phase accuracy. Dual rank flip-flop synchronizers suffer from a number of disadvantages, in addition to the inability to preserve the phase accuracy or information. The output signal from a dual rank synchronizer is available only after a time period greater than one clock period has transpired after the asynchronous event. Actually, the availability of the output signal is within a variable, non-deterministic delay period, which ranges from one clock period plus the setup time of a flip-flop to two clock periods This variable, non-deterministic delay range depends on the relative phase of the clock signal and the asynchronous event signal. The variability of the delay and the requirement for the passage of more than one clock period create substantial difficulties in digital system design, because it is desirable, in many circumstances, to have the synchronized clock output signal available sooner than the expiration of one clock period and/or at a constant time delay after the asynchronous event occurs.

BRIEF SUMMARY OF THE INVENTION

The present invention offers a new and improved alternative which overcomes many or all of the disadvantages associated with previously known synchronizers. The synchronization takes place in a manner that the synchronized clock output signal is in phase with the external asynchronous event signal, within a narrow, deterministic range of possible phase error; is a phase-shifted copy of or division of an internal stable frequency reference clock signal; is generated without the risk of synchronization failure due to a metastable condition; and is available a constant time delay after the asynchronous event signal. The delay from the activating event or edge of the asynchronous event signal to the delivery of the synchronized clock output signal is constant, is independent of the phase difference between the asynchronous input signal and the reference clock signal, and is not fixed by the period of the reference clock signal. The synchronized clock output signal is available in many cases after a delay time period of less than one reference clock period. The precision of the synchronized clock output signal is directly related to the accuracy of an internal stable frequency reference clock. The phase error of the synchronized clock output signal, relative to an external asynchronous input signal, is preferably determined by component delays, thereby avoiding calibration and trimming adjustments during manufacturing and use, which contributes to low cost and high reliability. The preferred form of the synchronizer is suitable for convenient, highly scalable, all-digital implementation within a single integrated circuit.

In accordance with its general aspects, the synchronizer of the present invention supplies a periodic output clock signal which is in synchronism with and phase shifted relative to a reference clock signal. The amount of the phase shift is established by reference to the occurrence of an asynchronous signal. A plurality of phase shifted digital versions of the reference clock signal are created. At the time of the occurrence of the asynchronous signal, the states of the plurality of phase shifted versions of the reference clock signal are sampled to logically define the one of the phase shifted versions which is to be utilized in deriving the synchronized output clock signal.

Preferably, the number of phase shifted versions of the reference clock signal is odd, and the time delay between each of these phase shifted versions is approximately equal, and the versions are spaced over the period of the reference clock signal. A register is preferably utilized as a means for sampling and holding the state values of the plurality of phase shifted versions at the occurrence of the asynchronous signal. Metastability induced in the output signals from memory cells or flip-flops of the register is accounted for in decoding the states of the values set in the register to select the phase shifted version, by allowing the metastability event to settle or by use of logic which disregards the metastable signal or signals when selecting the one of the phase shifted versions from which the output clock signal is derived.

The synchronized output clock signal is preferably available within one period of the reference clock signal, and after a fixed and predetermined time delay established by components within the synchronizer. The time delay is not influenced by the relative phase difference between the reference clock signal and the asynchronous event signal. Synchronization occurs more rapidly than with known synchronizers and the phase information can be preserved while rapidly synchronizing. The maximum phase error is determinable from the number of phase shifted versions of the reference clock signal and from the period of the reference clock signal, and is not dependent upon the wide range of variables which typically influence prior synchronizers. Because synchronization can be advantageously established in response to a single transition of the asynchronous signal and within a time period typically less than the period of one reference clock signal, synchronization can be established much more rapidly with the present synchronizer than with known prior synchronizers. Rapid synchronization allows more efficient and effective data transmission in communication systems, as well as in other applications.

The actual scope of the present invention is defined by the appended claims. A better understanding of the present invention can be gained by reference to the following detailed description taken in conjunction with the accompanying drawings.

BRIEF DESCRIPTION OF THE DRAWINGS

FIG. 1 is a generalized illustration of the clock synchronizer of the present invention; and the three major input signals to the clock synchronizer, a reference clock signal, a resync enable signal, and an asynchronous event signal; and the single output signal from the clock synchronizer, a synchronized clock signal.

FIGS. 2A, 2B, 2C and 2D are waveform diagrams of the reference clock signal, the resync enable signal, the asynchronous event signal and the synchronized clock signal, respectively, which are present in association with the clock synchronizer shown in FIG. 1.

FIG. 3 is a block diagram of one embodiment of the clock synchronizer shown in FIG. 1.

FIG. 4 is a diagram of logic components which illustrate the logical equations and functions of a phase logic selection circuit and a multiplexer circuit of the clock synchronizer shown in FIG. 3.

FIGS. 6A to 6R are waveform diagrams illustrating examples of the waveforms of signals present in the embodiments of the clock synchronizer shown in FIGS. 3 and 5.

FIG. 7 is an illustration of the logic equations and logic components utilized in an embodiment of the phase selection logic and multiplexer circuit, which is an alternative to that shown in FIG. 4, either embodiment of which may be employed in the clock synchronizers shown in FIGS. 3 and 5.

FIGS. 8A to 8BB are waveform diagrams illustrating the operation of the phase seleCtion logic and multiplexer circuit shown in FIG. 7.

FIG. 9 is a block diagram of a further alternative embodiment of the clock synchronizer shown in FIG. 1, used to achieve only metastable-free synchronization without preserving phase accuracy, and which is capable of synchronizing on the rising edge of an asynchronous event signal.

FIG. 10 is a block diagram of another alternative embodiment of the clock synchronizer shown in FIG. 9, which is capable of synchronizing on either the rising or falling edge of an asynchronous event signal.

FIG. 11 and FIG. 12 are logic diagrams of voter circuits employed in the embodiments of the clock synchronizers shown in FIGS. 9 and 10.

DETAILED DESCRIPTION

Figure 5:
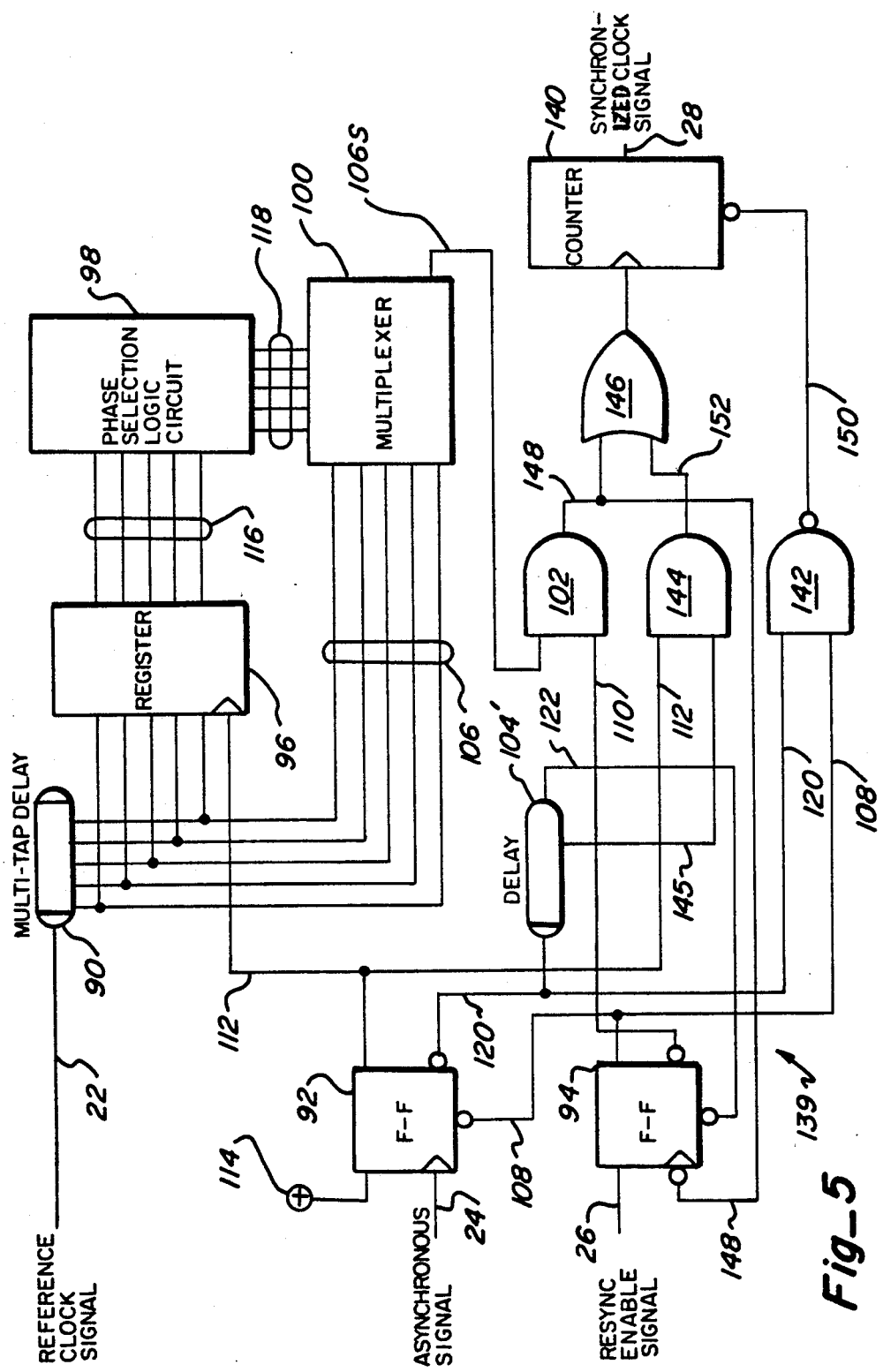
FIG. 5 is a block diagram of an alternative embodiment of the clock synchronizer shown in FIG. 1, wherein additional components are used in conjunction with the embodiment illustrated in FIG. 3.

The function of a clock synchronizer generally referenced 20 in FIG. 1, is to establish a temporary synchronized or predetermined phase and/or frequency relationship between a clocked, digital interface element (not shown) of which the synchronizer 20 is a part, and an external, independent-timebase, signal or data stream. The clock synchronizer 20 is required because the incoming data stream is generated from a separate time base other than the clock of the receiving interface element, or because the incoming data stream has inexact or variable timing due to variations in the external communication medium and/or the transmitting device.

The input signals to the synchronizer 20 are a reference clock signal at 22 which is preferably a digital square wave oscillating at a reference frequency; an asynchronous event signal at 24, an edge or some other characteristic of which indicates the point in time for synchronization and which is created by or from the incoming data stream or other asynchronously received signal; and a resync enable signal at 26 which must be asserted for a transition of the asynchronous signal at 24 to cause the synchronizer 20 to resynchronize. The reference clock signal at 22 can be supplied from an external stable frequency oscillator or from an internal stable frequency oscillator which is a part of the synchronizer 20. A stable frequency oscillator is not shown but its output signal, the reference clock signal 22, is shown. The output signal from the synchronizer 20 is a synchronized clock signal at 28, which is a copy or division of the reference clock signal 22 and which is phase-shifted by the amount necessary to achieve a predetermined phase relationship between the asynchronous signal at 24 and synchronized clock signal at 28.

Waveforms of the reference clock signal 22, the asynchronous signal 24, the resync enable signal 26, and the synchronized clock signal 28, supplied by an idealized clock synchronizer (one having no inherent component delays) are shown in FIGS. 2A, 2B, 2C and 2D, respectively. One typical synchronized phase relationship which can be produced by the clock synchronizer 20 is the alignment of rising edges of the synchronized clock signal 28 with the rising edge of the asynchronous event signal 24, as is illustrated in FIGS. 2C and 2D.

The reference clock signal 22 is shown as a digitally oscillating symmetric square wave with a specific period 30. A well-known crystal oscillator of high accuracy (e.g. ±0.01% to ±0.001%) will generally prove to be a suitable stable frequency source for the reference clock signal. At the beginning of the situation depicted in FIGS. 2A to 2D, the synchronized clock signal 28 is in exact phase with the reference clock signal 22. Any phase relationship may actually exist between the reference clock signal 22 and the synchronized clock 28, and resynchronization will still be achieved as described below. Synchronization is not dependent on the range of any pre-existing phase relationship.

Pulses 32, 34 and 36 are shown as occuring as a part of the asynchronous signal 26. The separating intervals and the duty cycles of the pulses 32, 34 and 36, are not restrictive to the operation of the synchronizer 30, provided that a pulse has some minimum width which is defined by the logic implementation technology (and typically only a few nanoseconds). The asynchronous pulses 32 and 36 do not affect the synchronized clock signal 28 because the pulses 32 and 36 occur when the resync enable signal 26 is negated.

The assertion of pulse 34 and the resync enable signal 26 during a resynchronization interval 38 causes resynchronization to take place, as is illustrated by the connecting line 40. The assertion of resync enable signal 26 forces the synchronized clock signal 28 to stay in a predetermined state (the low state is illustrated) during a blanking period 42 in order to prevent adverse spurious effects on the output synchronized clock signal 28 during resynchronization. This is illustrated by the arrow 44 and the absence of a rising edge of the synchronized clock signal 28 beginning at the time point designated 46 in FIGS. 2A to 2D and extending over the blanking period 42 to the time point 48. At point 48 synchronization is re-established as shown by the arrow 50 which indicates the occurrence of a rising transition of the synchronized clock signal 28. Resynchronization occurs at the time point 48, after the blanking period 42 and coincident with the rising edge of asynchronous signal pulse 34. The synchronized clock signal 28 immediately resumes at point 48, while maintaining reference clock period 30. The synchronized clock signal 28 is now in phase with the selected transition or leading edge of the pulse 34 of the asynchronous signal 26, and maintains this phase relationship, while oscillating at the frequency of the reference clock signal 22, until the next simultaneous assertion of a resync enable signal 26 and a pulse of the asynchronous signal 24.

Had the assertion of the resync enable signal 26 not negated the synchronized clock signal 28 during the blanking period 42, a rising edge could not have been generated at point 48 since the synchronized clock signal 28 would have already been high at that time. Since this description relates to the example of synchronizing rising edges of digital signals, it is necessary for the resync enable signal 26 to force the synchronized clock signal 28 to stay in a low state, so a rising edge could be generated when resynchronization occurs. If synchronization in a particular system only requires that a predetermined clock phase relationship be established for subsequent clock transitions, with no restrictions on clock pulse width during resynchronization, blanking or stopping the synchronized clock signal 28 during the blanking period 42 may be unnecessary.

The resync enable signal 26 is typically asserted in synchronism with a system clock signal (the reference clock signal 22 or a multiple thereof). The resync enable signal 26 is shown asserted at an interval which is one-fourth the interval 30 of the reference clock signal 22, as is shown in FIGS. 2A and 2B, thereby illustrating a multiple of four situation. The negation of the resync enable signal 26 typically occurs in direct response to the asynchronous transition which causes clock resynchronization, which is the pulse 34 in this example, as shown by arrow 52.

The following discussion of the embodiments of the clock synchronizer shown in FIGS. 3 and 5 will assume that the desired phase relationship is the alignment of the rising edge of one cycle of the synchronized clock signal 28 with a rising edge or transition of the asynchronous signal 24. Any other specific characteristic of the asynchronous signal 24, such as a falling edge, can be employed to establish synchronization in a similar manner. Of course, in practical implementations there will be some actual resynchronization delay between the transition of the asynchronous signal 24 and the first cycle of the resynchronized clock signal 28, so the events shown at point 48 will not occur simultaneously. One advantage of the present invention is that this actual resynchronization delay is constant and short, in contrast to most prior clock synchronizers which deliver variable resynchronization delays or require resynchronization delays long enough to sample multiple transitions of the asynchronous signal. If a particular application requires a phase relationship other than the aligned-edge relationship described herein, upon clock resynchronization this other phase relationship can be achieved by changing the logical order of selection of the signal which is supplied as the synchronized clock signal 28, as can be better appreciated from the description below.

Details regarding one embodiment 54 the clock synchronizer are described in conjunction with FIGS. 3 and 6A to 6R.

The synchronizer 54 shown in FIG. 3 receives the three input signals: the reference clock signal 22 (FIG. 6A); the asynchronous signal 24 (FIG. 6I), the leading edge or transition of which indicates the point 48 in time for synchronization to occur; and the resync enable signal 26 (FIG. 6G). The resync enable signal 26 must be asserted for a transition of the asynchronous signal 24 to cause resynchronization. The output signal from the clock synchronizer 54 is the synchronized clock signal 28 (FIG. 6R). For maximum efficiency the clock synchronizer is able to generate the appropriate synchronized clock signal 28 from a single transition of the asynchronous signal 26.

The synchronizer 54 includes a multi-tap delay line 90 with a total time delay no less than the period of the reference clock signal 22 and providing an odd number of taps for use (5 are illustrated); a pair of edge-triggered, D-type flip-flops 92 and 94; an edge-triggered register 96 with at least as many inputs and memory cell means or flip-flops as there are taps utilized on the delay line 90; a phase selection means or logic circuit 98 which determines and identifies the required phase for the synchronized clock signal 28 based on the code or set values of the register 96; a multiplexer 100 which passes the selected one of the signals available from the taps of the delay line 90 and inversions of those signals, under control of the phase selection logic circuit 98; a gate 102 to inhibit or "blank" the synchronized clock signal 28 while resynchronization is taking place; and a fixed delay line 104 which determines a fixed delay through the clock synchronizer 54. The delay 104 may not be required and the delay through the circuit can be correspondingly shortened, as will be described below.

The delay line 90 controls important aspects of the synchronizer's functionality. By conducting the reference clock signal 22 through the multi-tap delay line 90, a series of phase-shifted copies or versions of the reference clock signal are available at the various taps. These phase shifted versions of the signal 22 are collectively referenced 106 in FIG. 3 and are individually referenced 106A, 106B, 106C, 106D and 106E in FIGS. 6B, 6C, 6D, 6E and 6F, respectively. There are a wide variety of means to implement the delay function of the delay line 90, some of which are discussed below.

The delay line 90 must provide a total delay at least as long as the period of the reference clock signal 22 (if longer, only the first "Nt" taps of the delay are used). An odd number of taps spread approximately evenly in time delay increments over the period of the reference clock signal 22 should be available. A minimum inter-tap delay spacing must exist which is greater than or equal to the setup time of the flip-flops in the register 96. Approximately uniform delays applied to both the rising and falling edges of the reference clock signal 22 must occur at each tap. Delay lines with these characteristics are readily available a printed circuit board mountable hybrid circuit modules from a number of manufacturers, such as Bel Fuse, Inc., Jersey City, N.J. (digital delay line series 0447), and Data Delay Devices Inc., Clifton, N.J. (active delay line DDU-xF series). For integrated circuit applications silicon delay lines can be fabricated, or strings of gates with predetermined minimum and maximum propagation delays can be used.

The resync enable signal 26 (FIG. 6G) which enables resynchronization is supplied to the flip-flop 94. On the falling edge of the synchronized clock signal 28 (FIG. 6R), the flip-flop 94 sets (arrow 107, FIGS. 6H and 6R) and supplies an output signal 108 (FIG. 6H). The synchronized clock signal 28 (FIG. 6R) is held in the low state (arrow 109, FIGS. 6H and 6R) due to the application of signal 110 from the flip-flop 94 to the AND gate 102 until resynchronization occurs. Setting the flip-flop 94 negates an overriding reset created by signal 108 normally supplied to flip-flop 92. In situations where the resync enable signal 26 can be supplied in proper phase relationship with the synchronized clock signal 28, flip-flop 94 may be clocked by the resync enable signal 26 (with its D-input tied high), thereby eliminating the need to feed the synchronized clock signal 28 back to the clock terminal of flip-flop 94.

The rising edge of the asynchronous signal 24 (FIG. 6I) sets flip-flop 92 after negation of the overriding reset (signal 108) to thereby initiate clock resynchronization (shown by an event line 48, FIGS. 6A to 6R). Flip-flop 92 supplies an output signal 112 (FIG. 6J), which transitions from low to high immediately after the rising edge of the asynchronous signal 24. Flip-flop 92 will not go into a metastable condition due to a setup time violation, because its D-input is connected to a high logic level signal 114.

When flip-flop 92 sets at the beginning of a resynchronization event (48, FIGS. 6A to 6R), the rising edge of its output signal 112 clocks the register 96, causing the current states or logic levels of the phase shifted clock signals 106 to be stored as a code in the register 96. The current states of the phase shifted clock signals 106A to 106E are shown in FIGS. 6B to 6F at the intersection of the event reference line 48. The output signals available from the register 96 at the event line 48 are illustrated at 116A to 116E in FIGS. 6K to 6O, respectively. The states of the output signals 116A to 116E define a code or sampled phase information signals and are collectively referenced in FIG. 3 as 116.

The particular situation illustrated in FIGS. 6C and 6L is a case where the resynchronization event 48 created by the asynchronous signal 24 is very close in time to the transition of the phase shifted clock signal 106B, thereby causing a setup time violation 113 (FIG. 6C) at one flip-flop of the register 96. The setup time violation induces a metastable condition 115 in the output signal 116B from this flip-flop of the register (FIG. 6L). As soon as the metastable condition settles, the output signal levels 116A to 116E from the register correspond to the levels of the signals 106A to 106E at the resynchronization event 48. Signal 116B may settle in its previous state, which is acceptable since that state is indicative of a phase one earlier in the sequence and event 48 is within the phase error tolerance of that phase.

With an odd number of taps of the delay line 90 spaced over the period of the reference clock signal 22, at most one of the clock phases is in transition at any instant in time. If an even number of delay line taps were spaced over the period of the reference clock signal 22, there would be instants where two clock phases were in transition at the same time, i.e. one phase rising while the other phase falling. If two phases could be changing at the same time, there would be the possibility of two flip-flops in the register 96 going metastable at the same time, making the synchronizer 54 lower in phase accuracy.

The phase information 116 from the register 96 (after metastable condition settling) is encoded by the phase selection logic circuit 98 to generate selection control signals 118. The selection control signals 118 control the multiplexer 100 to select a single one of the phase-shifted clock signals 106, or an inverted version of one of these signals, and supply the selected signal at 106S. The multiplexer 100 inverts the five phase shifted clock signals 28 (106A to 106E, FIG. 6B to 6F) to create five additional available signals, any one of the ten (5 normal and 5 inverted) of which becomes the signal 106S. The signal at 106S becomes the synchronized clock signal 28 after passing through the gate 102. The register 96, the phase selection logic circuit 98 and the multiplexer 100 are one example of means for selecting one of the phase-shifted versions of the reference clock signal from which to derive the synchronized clock signal 28 based on the code or digital states of the phase-shifted versions clocked into the register 96 by the asynchronous signal passed through flip-flop 92.

When a metastable condition 115 (FIG. 6L) occurs, the selected signal 106S from the multiplexer 100 can undergo a somewhat prolonged settling time 124 (FIG. 6P), which is prevented from affecting the synchronized clock signal 28 during a blanking period 126 (FIG. 6Q) imposed by the delay line 104. The blanking delay period 126 must be at least as long as the metastable settling time of the flip-flops in register 96 plus the propagation delays through the phase selection logic 98 and the multiplexer 100. The length of delay imposed by the delay line 104 is normally calculated to end during a low half-cycle of the multiplexer output signal 106S.

The single output digital delay line 104 is used to prevent spurious effects on the synchronized clock signal 28 due to settling times through the register 96, the phase selection logic circuit 98, and the multiplexer 100. The delay line 104 creates a fixed time delay or blanking period 126 (FIG. 6Q) between the setting of flip-flop 92 and the clearing of flip-flop 94. When flip flop 92 sets in response to the asynchronous signal 26, a signal 120 is supplied to the fixed delay line 104. Upon expiration of the predetermined delay time established by the fixed delay line 104, a signal 122 is supplied to reset or clear the flip-flop 94 (arrow 127, FIGS. 6Q and 6H). After being cleared, the flip-flop 94 resets flip-flop 92 with the assertion of signal 108 (arrow 128, FIGS. 6H and 6J), to prepare flip-flop 92 for the next resynchronization event. Resetting flip-flop 94 ends the blanking interval 126, permitting the AND gate 102 to gate the signal 106S from the multiplexer 100 as the synchronized clock signal 28 (arrow 141, FIGS. 6Q and 6R). The clock synchronizer 54 is now synchronized in phase relative to a transition (edge) of the asynchronous signal 24.

One requirement of the delay line 104 is that the minimum time delay between the assertion of the asynchronous signal 24 (when resynchronization is enabled) and the occurrence of the synchronized clock signal 28, should be a fixed value of predetermined duration. The amount of this time delay is determined as follows. When the number of taps ("Nt") of the multi-tap delay line 90 is just sufficient to provide the desired phase accuracy (as defined in the second following paragraph), the minimum delay time of delay line 104 must be at least the metastable settling time of the flip-flops in register 96 plus the propagation delay through the phase selection logic circuit 98 and the multiplexer 100. When the desired phase accuracy can be achieved by not more than ((Nt/2)−0.5) taps of the multi-tap delay line 90, the minimum delay time of delay line 104 can be reduced to equal the propagation delays through the phase selection logic circuit 98 plus the multiplexer 100. Normally, extended delays will be in increments equal to the period of reference clock signal 22, but arbitrary extensions are possible. An arbitrary extension is especially useful in cases where the initial cycle of the synchronized clock signal 28 may have a predefined amount of asymmetry, but where a square wave is desired on all subsequent cycles.

Because the output signal 112 from the flip-flop 92 begins upon detection of a transition of the asynchronous signal 24, and does not involve the reference clock signal 22, the delay through the synchronizer 54 is dependent upon either component delays or the duration of the delay line 104. Unlike a conventional, dual-rank flip-flop synchronizer, the synchronizer 54 has no variation in propagation delay related to the phase relationship between the reference clock signal 22 and the asynchronous signal 24.

The achievable phase accuracy of the synchronized clock signal 28, relative to the asynchronous signal 24, is equal to one-half of longest inter-tap delay on the delay line 90. In the typical case, where the taps on the delay line 90 are equally spaced in delay duration, the maximum phase error is given by equation (1):

$$Tpe = 0.5(Trc/Nt) \qquad (1)$$

Where Tpe is the maximum phase error (in ns),
Trc is the reference clock period (in ns), and
Nt is the number of taps used on the delay line 90.

By appropriate adjustment of the phase shifted clock versions 106 to the multiplexer 100, the symmetry of this phase error can be adjusted. The typical case, as in the circuit shown herein, is an error of zero to - one-half of the inter-tap delay.

Details of the phase selection logic circuit 98 and multiplexer 22 are shown in FIG. 4, for an embodiment of the synchronizer which synchronizes to an accuracy of one-tenth of the reference clock period using a 5-tap delay line 90. The 5 bits of phase information 116 are shown as signals 116A, 116B, 116C, 116D and 116E The ten meaningful combinations of this phase information (normal and inverted assertions of the signals 116A, 116B, 116C, 116D and 116E achieved by logical means) are decoded by the 10 5-input AND gates 132. The states decoded by these AND gates 132 are mutually exclusive, so no more than one of the 10 selection control signals 118 may be asserted at any time. Due to the repetitive nature of the reference clock signal 22 and the phase shifted clock versions 106 which are sampled in the register 96, the 10 states decoded by the phase selection logic circuit 98 are the only valid states. Accordingly, once the possible metastable condition 115 (FIG. 6L) in one flip-flop of register 96 (FIG. 3) has settled, only one of the selection control signals 118 will be asserted. The asserted one of the selection control signals 118 specifies which one of the phase shifted clock signals 106, or inversions thereof, will be supplied as the synchronized clock signal 28 within the maximum allowable range of phase error. The logic circuitry shown in FIG. 4 is preferably implemented using commercially available programable array logic devices, such as a PAL16L8D and one 74F00 NAND gate.

The logic equation provided by the gating arrangement shown in FIG. 4 exclusively selects the phase shifted clock signal 106, or an inversion thereof, based on the maximum acceptable phase error (0 to $+\frac{1}{2}$ the inter-tap delay, in this example) based on a diagrammatic analysis of the normal and inverted phase shifted clock signals and the relative occurrence of the asynchronous signal. Other gating arrangements could be utilized for selections of different acceptable ranges of phase error or phase displacement.

The five phase clock signals 106 from the delay line 90 are brought into the multiplexer 100 as signals 106A, 106B, 106C, 106D and 106E. The single asserted selection control signal 118 selects the appropriate clock phase signal or an inversion thereof by enabling only one of 10 2-input AND gates 134 and 136. The five AND gates 134 pass their input phase shifted clock signal unmodified in phase, and the other 5 of these AND gates 136 invert their input phase shifted clock signal. This permits 10 discrete clock phases to be generated using only 5 phase-shifted reference clock verions 106. The selected clock output signal 106S from the multiplexer 22 is generated by combining the outputs of the 10 AND gates 134 and 136 in a 10-input OR gate 138.

The phase selection truth table represented by the components shown in FIG. 4 is set forth below:

| Signal | | | | | |
|---|---|---|---|---|---|
| 116A | 116B | 116C | 116D | 116E | Selected Signal |
| 0 | 0 | 1 | 1 | 1 | 106E |
| 0 | 0 | 0 | 1 | 1 | inverted 106C |
| 1 | 0 | 0 | 1 | 1 | 106A |
| 1 | 0 | 0 | 0 | 1 | inverted 106D |
| 1 | 1 | 0 | 0 | 1 | 106B |
| 1 | 1 | 0 | 0 | 0 | inverted 106E |
| 1 | 1 | 1 | 0 | 0 | 106C |
| 0 | 1 | 1 | 0 | 0 | inverted 106A |
| 0 | 1 | 1 | 1 | 0 | 106D |
| 0 | 0 | 1 | 1 | 0 | inverted 106B |

It is possible to extend this type of phase selection arbitrarily, with each additional pair of taps on the delay line 90 providing 4 additional phases. The choice of 5 taps is convenient in terms of commercially available delay lines and providing phase accuracy to one-tenth of the period of the reference clock signal 22.

The phase shifted clock signal 116E is equivalent to the reference clock signal 22 (FIGS. 6A and 6F). In theory, the synchronizer 54 will function equivalently using the reference clock signal 22 and phases 106A to 106D, or using phases 106A to 106E as the five inputs to the register 96 and multiplexer 98. In actual practice, however, the delays between the taps of the delay line 90 can be controlled more accurately than the delay between the input to a delay line and the first tap on that delay line. Therefore, in cases where sufficient taps are available on the delay line, a tap which provides a copy of the reference clock signal (such as signal 106E in this example) is preferable to direct use of the reference clock signal 22.

Another embodiment 139 of the synchronizer is shown in FIG. 5. The synchronizer 139 incorporates all of the components and functionality of the synchronizer 54 shown in FIG. 3. Accordingly, the same components and signals in the synchronizers 54 and 139 are referenced by the same reference numbers, and the description regarding these components is the same and will not be repeated.

For maximum efficiency the clock synchronizer should be able to generate the appropriate synchronized clock signal 28 from a single transition of the asynchronous signal. The ability to accurately synchronize from one asynchronous signal transition requires that the first cycle of the synchronized clock signal 28 be available very rapidly.

The additional circuitry included in the synchronizer 139 which is not present in the synchronizer 54 (FIG. 3) includes a counter 140 to generate the synchronized clock signal 28 from the selected one 106S of the phase shifted and inverted signals available from the multiplexer 100; and a number of logic gates 142, 144 and 146 which logically control the level of various signals 148, 150 and 152 in the synchronizer 139. This additional circuitry provides means for immediately providing an output synchronized clock signal 28 after the blanking period, and repeating that synchronized clock signal at a frequency substantially less than the frequency of the reference clock signal 22, that is, at a frequency which is a division of the reference clock frequency. This functionality is particularly useful where it is necessary to synchronize an output signal of a substantially lesser frequency that the reference clock frequency, but still retain a high degree of in-phase tolerance.

The synchronized clock signal 28 is generated from an internal synchronized clock signal 148 by the counter 140 and gates 142, 144 and 146. The basic function of the counter 140 is to serve as a frequency divider. By dividing the cycles of the signal 148 by a predetermined value, in the example described below by 8, each cycle of the synchronized clock signal 28 occurs in synchronism with and in a predetermined phase relationship with the activating transition of the asynchronous signal 24. The count sequence of the counter 140 is more complex than that of a simple modulo-8 frequency divider due to the fact that the initial cycle of the synchronized clock signal 28 following resynchronization is shorter than those of subsequent cycles due to the blanking interval (126, FIG. 6Q) of the synchronizer 139.

Operation of the counter 140 is as follows. Upon assertion of the resync enable signal 24, flip-flop 94 sets, negating signal 110 and thereby halting the internal synchronized clock signal 148 supplied by AND gate 102 from the signal 106S. Setting of flip-flop 94 also causes the counter 140 to be asynchronously cleared by the assertion (active low) of a counter reset signal 150 from the NAND gate 142. The counter reset signal 150 remains asserted until the occurrence of the asynchronous signal 24, which sets flip-flop 92 and changes the state of signal 120, which negates signal 150 by action of the NAND gate 142.

A transition of the synchronized clock signal 28 is required immediately following the occurrence of the asynchronous signal 24 during a resynchronization event. The initial transition of the synchronized clock signal 28 occurs immediately due to the setting of flip-flop 92, which asserts signal 112, thereby resulting in the assertion of signal 152 through an AND gate 144. The other input signal 145 to the AND gate 144 comes from an intermediate tap on delay line 104'. (The fixed delay 104 shown in FIG. 3 does not utilize an intermediate tap, but otherwise the functionality remains the same.) The exact delay of this intermediate tap signal 145 is not critical, so long as it is shorter than the delay of signal 122 by at least the propagation delay of flip-flop 94. The purpose of this intermediate delay signal 145 is to force the negation of signal 152 prior to the end of the blanking interval which occurs due to the negation of signal 122. The assertion of signal 152 causes a single clock pulse to be supplied to the counter 140 through an OR gate 146.

The presence of the single gate 142 in the combinatorial path between flip-flop 92 and the reset input terminal of counter 140, and the presence of two gates 144 and 146 in the combinatorial path between flip-flop 92 and the clock input terminal of counter 140 ensures that the reset signal 150 will be negated before the initial assertion of the synchronized clock signal 28.

The count sequence of counter 122 is shown below, with output Q2 used as the synchronized clock signal 28.

| Q3 | Q2 | Q1 | Q0 | |
|---|---|---|---|---|
| 0 | 0 | 0 | 0 | reset state |
| 0 | 1 | 0 | 0 | clocked due to signal 152 |
| 0 | 1 | 0 | 1 | clocked due to signal 106S |
| 0 | 1 | 1 | 0 | . |
| 1 | 0 | 0 | 0 | . |
| 1 | 0 | 0 | 1 | . |
| 1 | 0 | 1 | 0 | . |
| 1 | 0 | 1 | 1 | . |

-continued

| Q3 | Q2 | Q1 | Q0 | |
|---|---|---|---|---|
| 1 | 1 | 0 | 0 | . |
| 1 | 1 | 0 | 1 | . |
| 1 | 1 | 1 | 0 | . |
| 1 | 1 | 1 | 1 | . |

The sequence between the two horizontal lines repeats until the next reset event occurs. A count sequence of this type can easily be generated by a programmable array logic (PAL) device such as a PAL22V10, made by Advanced Micro Device, or by a PAL16L8D along with a four-bit register such as a 74F175. The duration of the high period of the initial cycle of the synchronized clock signal 28 is the same as that of subsequent pulses, despite the fact that only three counter states have Q3 high in the initial count sequence due to the end of the blanking interval (126, FIG. 6Q) between state 0100 and state 0101.

In practice, the gates 142, 144 and 146 are typically gating functions which can be economically implemented by a programmable array logic (PAL) structure. For example, a single PAL16L8D integrated circuit from Advanced Micro Devices, plus a single 74F00 dual-input or 74F10 triple-input NAND gate for the output stage of the multiplexer 100 can be used.

As discussed above, with Nt taps on the delay line, the maximum phase error is given by equation (1) above, while requiring a blanking period 126 which is greater than the flip-flop metastable settling time. A version of the synchronizer, using 2Nt+1 taps on the delay line, can resolve to a maximum phase error given by the following equation (2):

$$Tpe = Trc/(2Nt+1) = 0.5 \times (Trc/(Nt+0.5)) \quad (2),$$

without having to blank for the flip-flop metastable settling time. This maximum phase error achieves slightly better phase accuracy than the version of the synchronizer using Nt taps. As will be shown below, the synchronizer using 2Nt+1 taps can, under certain conditions, create short-term clock period variations ("jitter") equal to one-half its phase accuracy, and thereby operate within its accuracy tolerance. If such output clock jitter is not acceptable, a variant of the synchronizer can supply a jitter-free output clock signal, without requiring a metastable settling delay, while maintaining a maximum phase error given by equation (3)

$$Tpe = 2 \times (Trc/(2Nt+1)) = (Trc/(Nt+0.5)) \quad (3)$$

The concept of Hamming Distance is relevant to the clock synchronizer 20 in that, in order to select one of Nt (or 2Nt, or Nt+1, for example) distinct clock phases, the multiplexer 100 must be controlled by a selection control signal 118 with at least Nt (or 2Nt, or Nt+1, respectively) states. If the sampled phase information signals 116 to the phase selection logic circuit 98 have only this selected number of unique states, the effective Hamming Distance of the sampled phase information signals 116, treated as a code, is 0. If additional bits of sampled phase information 116 can be made available in such a manner that this additional information, treated as a code, has a Hamming Distance of 1, then any one bit from among the sampled phase information 116 can be metastable without affecting the selection of the phase shifted clock version within the acceptable tolerance of phase error. Similarly, if the Hamming Distance is 2, then any two bits from among the sampled phase information 116 can be metastable without affecting the selection. To obtain a Hamming Distance of 1, it is necessary to have 2Nt+1 taps on the delay line. Of course 2Nt taps on the delay line would suffice from an information theory point of view, but as discussed above, the total number of taps should be odd.

FIG. 7 shows an embodiment of the phase selection logic 98 and multiplexer 100 which synchronizes to a comparable accuracy as the circuit shown in FIG. 4. Regarding FIG. 4 the Nt was 5, resulting in a phase accuracy of 0.1(Trc). The embodiment shown in FIG. 6 assumes 11 (2×5+1) taps on the delay line 90 (FIGS. 3 or 5) thus creating 11 versions of the reference clock signal 106 (signals D1–D11), resulting in a phase accuracy of 0.091(Trc). The 11 bits of the phase information sampled in the register 96 (FIGS. 3 or 5) are brought into a combination phase selection logic and multiplexer gating circuit 160 as signals 116 Q1–Q11. The gating circuit 160 is typical of what would actually be implemented using programmable array logic (PAL) devices. Either the 2-part implementation, shown in FIG. 4 or a 1-part implementation, shown in FIG. 7, can be used in either embodiment of the synchronizer 54 or 139.

The 11 meaningful combinations of the phase information signals 116 are decoded by the 11 11-input AND gates 162. Ten of the inputs to each AND gate 162 decode the states of ten signals Q1–Q11 while the eleventh input passes through one of the phase shifted versions D1 to D11 of the reference clock signal. The states decoded by the AND gates 162 are mutually exclusive, so no more than one of the 11 inputs to the OR gate 64 is asserted at any time.

Due to the repetitive nature of the reference clock signal and the phase shifted versions 116 of the reference clock signal which are sampled in the register 96, the 11 states decoded by the gating circuit 160 are the only valid states. Because each transition between decoded states varies by only one bit, and because at any sampling point no more than one flip-flop output signal of register 96 can be metastable, by not including the possibly-metastable one of the 11 Q-signals as an input signal to the AND gate 162 which decodes the selection, metastable-free decoding is accomplished. The gates 162 accomplish this result with the metastable one of the Q-signals 116 being omitted from the inputs of each gate 162, to achieve a Hamming distance of 1.

FIGS. 8A to 8BB show signal waveforms relevant to the operation of the gating circuit 160 shown in FIG. 7. Note that the phase-shifted clock D11 (FIG. 8L) is equivalent to the reference clock signal 22 (FIG. 8A). In theory, this circuit will function equivalently using the reference clock signal 22 and phase versions D1–D10, or using phase versions D1–D11 as the eleven inputs to the register 96 and the gating circuit 160. A practical advantage might result from using signal 22 and signals D1 to D10, since 10-tap delay lines are currently commercially available, but 11-tap delay lines are believed not to be commercially available as separate components. However, the delays between the taps of the delay line can be controlled more accurately than the delay between the input of a delay line and the first tap on that delay line. Therefore, in cases where sufficient taps are available on the delay line, a tap which provides a copy of the reference clock signal 22 (such as D11 in this example) is preferable to direct use of the reference clock signal 22. Delay lines of any reasonable number of taps can be created, however, by known techniques.

The particular synchronization activity depicted in FIGS. 8A to 8BB illustrates a case where the asynchronous signal 24 undergoes a transition to establish signal 112 (FIG. 8M) a resynchronizing point 48 which is very close to the transition of phase signal D5 (FIG. 8F), causing a setup time violation 168 at the D5 input flip-flop of register 96. A metastable event 170 is induced on the Q5 output signal (FIG. 8S) of the register 96. When a metastable event occurs, the gating circuit 160 output selected signal 106S (FIG. 8Z) does not undergo any extension of its settling time 172, which is determined solely by gate delays in the gating circuit 160. The length of the metastable event 170 (FIG. 8S) has been depicted as extremely long to clearly demonstrate the insensitivity of this circuit to such occurrences The blanking period 126 imposed by the delay line 104' must only be as long as the settling time of the gating circuit 160, which is substantially shorter than the metastable settling time of the circuitry shown in FIG. 4, which includes the metastable settling time of the flip-flops in register 96. In practice, the delay 104' is preferably implemented by gate delays.

The phase selection truth table represented by the gating circuit 160 shown in FIG. 7 and the signals shown in FIG. 8A to 8BB is set forth below:

| Q1 | Q2 | Q3 | Q4 | Q5 | Q6 | Q7 | Q8 | Q9 | Q10 | Q11 | Output Phase |
|----|----|----|----|----|----|----|----|----|-----|-----|--------------|
| X  | 0  | 0  | 0  | 0  | 0  | 1  | 1  | 1  | 1   | 1   | D1           |
| 1  | X  | 0  | 0  | 0  | 0  | 0  | 1  | 1  | 1   | 1   | D2           |
| 1  | 1  | X  | 0  | 0  | 0  | 0  | 0  | 1  | 1   | 1   | D3           |
| 1  | 1  | 1  | X  | 0  | 0  | 0  | 0  | 0  | 1   | 1   | D4           |
| 1  | 1  | 1  | 1  | X  | 0  | 0  | 0  | 0  | 0   | 1   | D5           |
| 1  | 1  | 1  | 1  | 1  | X  | 0  | 0  | 0  | 0   | 0   | D6           |
| 0  | 1  | 1  | 1  | 1  | 1  | X  | 0  | 0  | 0   | 0   | D7           |
| 0  | 0  | 1  | 1  | 1  | 1  | 1  | X  | 0  | 0   | 0   | D8           |
| 0  | 0  | 0  | 1  | 1  | 1  | 1  | 1  | X  | 0   | 0   | D9           |
| 0  | 0  | 0  | 0  | 1  | 1  | 1  | 1  | 1  | X   | 0   | D10          |
| 0  | 0  | 0  | 0  | 0  | 1  | 1  | 1  | 1  | 1   | X   | D11          |

It is possible to extend this type of phase selection arbitrarily, with each additional pair of taps on the delay line 90 providing 2 additional phases. The logic functions depicted in the circuit 160 can be implemented as part of an integrated circuit, with the delay line 90 implemented on the same integrated circuit using a plurality of logic gates in series. The use of on-chip delay elements is advantageous for reasons of reducing the component count, increasing reliability, and making the circuit 160 more scalable from an integrated basis. Equal spacing of inter-tap delays is not required. The only requirements are that the minimum inter-tap delays exceed the setup times of the flip-flops in register 96, and the maximum inter-tap delay be calculatable, since that value determines the maximum phase error.

The gating circuit 160 shown in FIG. 7 can, in certain circumstances, create some output jitter. The timing of the asynchronous signal 24 can create a metastable event in the flip-flop of register 96 which is sampling the one signal 106 which changes from one to zero in between the phase selection changes. These cases are illustrated by "U"s (for "Uncertain") in the truth table below:

| Q1 | Q2 | Q3 | Q4 | Q5 | Q6 | Q7 | Q8 | Q9 | Q10 | Q11 | Output Phase |
|---|---|---|---|---|---|---|---|---|---|---|---|
| X | 0 | 0 | 0 | 0 | 0 | 1 | 1 | 1 | 1 | 1 | D1 |
| X | 0 | 0 | 0 | 0 | 0 | U | 1 | 1 | 1 | 1 | D1 |
| 1 | X | 0 | 0 | 0 | 0 | 0 | 1 | 1 | 1 | 1 | D2 |
| 1 | X | 0 | 0 | 0 | 0 | 0 | U | 1 | 1 | 1 | D2 |
| 1 | 1 | X | 0 | 0 | 0 | 0 | 0 | 1 | 1 | 1 | D3 |
| 1 | 1 | X | 0 | 0 | 0 | 0 | 0 | U | 1 | 1 | D3 |
| 1 | 1 | 1 | X | 0 | 0 | 0 | 0 | 0 | 1 | 1 | D4 |
| 1 | 1 | 1 | X | 0 | 0 | 0 | 0 | 0 | U | 1 | D4 |
| 1 | 1 | 1 | 1 | X | 0 | 0 | 0 | 0 | 0 | 1 | D5 |
| 1 | 1 | 1 | 1 | X | 0 | 0 | 0 | 0 | 0 | U | D5 |
| 1 | 1 | 1 | 1 | 1 | X | 0 | 0 | 0 | 0 | 0 | D6 |
| U | 1 | 1 | 1 | 1 | X | 0 | 0 | 0 | 0 | 0 | D6 |
| 0 | 1 | 1 | 1 | 1 | 1 | X | 0 | 0 | 0 | 0 | D7 |
| 0 | U | 1 | 1 | 1 | 1 | X | 0 | 0 | 0 | 0 | D7 |
| 0 | 0 | 1 | 1 | 1 | 1 | 1 | X | 0 | 0 | 0 | D8 |
| 0 | 0 | U | 1 | 1 | 1 | 1 | X | 0 | 0 | 0 | D8 |
| 0 | 0 | 0 | 1 | 1 | 1 | 1 | 1 | X | 0 | 0 | D9 |
| 0 | 0 | 0 | U | 1 | 1 | 1 | 1 | X | 0 | 0 | D9 |
| 0 | 0 | 0 | 0 | 1 | 1 | 1 | 1 | 1 | X | 0 | D10 |
| 0 | 0 | 0 | 0 | U | 1 | 1 | 1 | 1 | X | 0 | D10 |
| 0 | 0 | 0 | 0 | 0 | 1 | 1 | 1 | 1 | 1 | X | D11 |
| 0 | 0 | 0 | 0 | 0 | U | 1 | 1 | 1 | 1 | X | D11 |

Wherever a "U" appears in the truth table above, if the sampling flip-flop of the register 96 goes metastable in a manner where its output signal oscillates between the high and low states, the selected signal 106S could alternate between two adjacent clock phases until the metastable condition settles. The time period of successive clock intervals can vary under this metastable condition by $(0.25 \times (Trc/(Nt+0.5)))$ for up to the metastable settling time after a transition of the asynchronous signal 24. Since this variance is only one-half the specified phase accuracy, the resulting jitter is usually not of significant concern.

If a particular application requires an output signal which does not jitter, either the approach used in FIG. 3, or a variant of the approach shown in FIG. 5 where two signals are not decoded for each phase selected, can be used. Leaving 2 bits out of each selection (Hamming Distance 2), results in doubling the maximum phase error to $(0.5 \times (Trc/(Nt+0.5)))$. The resulting truth table for the 11-tap case in this situation is shown below:

| Q1 | Q2 | Q3 | Q4 | Q5 | Q6 | Q7 | Q8 | Q9 | Q10 | Q11 | Output Phase |
|---|---|---|---|---|---|---|---|---|---|---|---|
| X | 0 | 0 | 0 | 0 | 0 | X | 1 | 1 | 1 | 1 | D1 |
| 1 | 1 | X | 0 | 0 | 0 | 0 | 0 | X | 1 | 1 | D3 |
| 1 | 1 | 1 | 1 | X | 0 | 0 | 0 | 0 | 0 | X | D5 |
| 0 | X | 1 | 1 | 1 | 1 | X | 0 | 0 | 0 | 0 | D7 |
| 0 | 0 | 0 | X | 1 | 1 | 1 | 1 | X | 0 | 0 | D9 |
| 0 | 0 | 0 | 0 | 0 | X | 1 | 1 | 1 | 1 | X | D11 |

FIG. 9 depicts a derivative embodiment 180 of the synchronizer 20 for achieving metastable-free synchronization using only an asynchronous event signal and without preserving phase information. The reference clock signal 22 is used to clock the register. In this case the register is illustrated by D-type flip-flops 182, 184 and 186. The asynchronous signal 24 is applied to the 3-tap delay line 188. The delay 188 will generally be implemented using gate delays, with 2 taps plus direct use of the asynchronous signal 24 into flip-flop 182.

Synchronization occurs only on the rising edge of the asynchronous signal 24. Since no more than one of the three flip-flops 182, 184 and 186 can go metastable on any edge of the reference clock signal 22, a 2-of 3 high voter circuit 190 will produce a metastable-free synchronized output signal 191 without the two-clock delay typical of a dual-rank flip-flop synchronizer. The synchronized signal 191 will be used by subsequent stages of logic (not shown) which operate synchronously with the reference clock signal 22.

If it is necessary to synchronize both the rising and falling edges of the asynchronous signal 24, an embodiment 191 shown in FIG. 10 can be used. A multiplexer 192 is controlled by the state of the last cycle of the synchronized signal 191 as sampled by a flip-flop 194. If the state of the synchronized signal 191 was low, a 2-of-3 high voter circuit 190 is selected by the multiplexer 192 to synchronize with the rising edge. If the state of the synchronized signal 191 was high, a 2-of-3 low voter circuit 198 is selected by the multiplexer 192 to synchronize with the falling edge. 2-of-3 voter circuits are well known to those skilled in digital design. The logic gates which implement the 2-of-3 high voter circuit 190 is shown in FIG. 11 and the 2-of-3 low voter circuit 198 is shown in FIG. 12.

The improvements available from the synchronizer of the present invention are significant and have been described above. The number of embodiments of the synchronizer have also been described in detail. This description has been made by way of preferred example, and the scope of the invention is defined by the appended claims.

What is claimed:

1. A synchronizer for supplying a periodic output clock signal which is in synchronism with a periodic reference clock signal and which is phase shifted relative to the reference clock signal by an amount established by reference to the occurrence of an asynchronous signal, comprising:
   means receptive of the reference clock signal for creating a plurality of digital versions of the reference clock signal which are phase shifted relative to one another over the period of the reference clock signal;
   means receptive of the phase shifted versions and operative for supplying the phase shifted versions and inversions of the phase shifted versions; and
   means receptive of the asynchronous signal and the plurality of phase shifted versions and operative for selecting one of the phase shifted versions and inversions thereof from which to derive the output clock signal based on the digital states of the phase shifted versions at the time of the occurrence of the asynchronous signal, said means for selecting one of the phase shifted versions comprising register means receptive of all of the phase shifted versions and operative in response to the asynchronous signal for setting values therein which correspond to the states of the phase shifted versions upon the occurrence of the asynchronous signal, and phase selecting means receptive of the code and operative for determining from the code the one of the phase shifted versions and inversions thereof from which the output clock signal is to be derived.

2. A synchronizer as for supplying a periodic output clock signal which is in synchronism with a periodic reference clock and which is phase shifted relative to the reference clock signal by an amount established by reference to the occurrence of an asynchronous signal, comprising:
   means receptive of the reference clock signal for creating a plurality of digital versions of the reference clock signal which are phase shifted relative to one another over the period of the reference clock signal; and means receptive of the asynchronous signal and the plurality of phase shifted versions and operative for selecting one of the phase shifted clock versions from which to derive the output clock signal based on the digital states of the phase shifted clock versions at the time of the occurrence of the asynchronous signal; and wherein the relative phase relationship between the output clock signal and the occurrence of the asynchronous event signal falls within a predetermined range of 0 to one-half of the reference clock period divided by the number of phase shifted versions.

3. A synchronizer for supplying a periodic output clock signal which is in synchronism with a periodic reference clock signal and which is phase shifted relative to the reference clock signal by an amount established by reference to the occurrence of an asynchronous signal, comprising:

means receptive of the reference clock signal for creating a plurality of digital versions of the reference clock signal which are phase shifted relative to one another over the period of the reference clock signal; and means receptive of the asynchronous signal and the plurality of phase shifted versions and operative for selecting one of the phase shifted clock versions from which to derive the output clock signal based on the digital states of the phase shifted clock versions at the time of the occurrence of the asynchronous signal; and wherein the relative phase relationship between the output clock signal and and the occurrence of the asynchronous event signal is determined substantially only from the number of phase-shifted clock versions and a maximum time period between any two sequential phase-shifted versions.

4. A synchronizer as defined in claim 1, 2 or 3 wherein:

said means for creating a plurality of phase shifted versions of the reference clock signal comprises a multi-tap delay means, and each tap of the multi-tap delay means supplies at least one phase shifted version; and the time delay between each of the taps of the multi-tap delay means is approximately equal over the period of the reference clock signal.

5. A synchronizer as defined in claim 4 wherein:
the plurality of versions of the reference clock signal is an odd number.

6. A synchronizer as defined in claim 1 wherein:
a selected one of the phase shifted versions or inversions thereof is supplied as the output clock signal; and
said phase selecting means uniquely identifies the one of the phase shifted versions or inversions thereof which is supplied as the output clock signal.

7. A synchronizer as defined in claims 1 or 6 wherein:
said phase selecting means further comprises gating means receptive of the set values and operative for deriving on a mutually exclusive basis the one of the phase shifted versions or inversions thereof.

8. A synchronizer as defined in claim 7 wherein:
the gating means is also operative in response to inversions of the set values.

9. A synchronizer as defined in claim 8 wherein:
the gating means is also receptive of the phase shifted versions and the inversions thereof.

10. A synchronizer as defined in claim 8 further comprising:
second gating means in addition to the gating means first aforementioned; and wherein:
said first gating means is operative in response to the set values and inversions thereof and is operative to supply a selection control signal which uniquely identifies the one of the phase shifted versions or the inversions thereof; and
said second gating means is receptive of the phase shifted versions and inversions thereof and is operative in response to the selection control signal for supplying the selected one of the phase shifted versions or inversions thereof.

11. A synchronizer as defined in claim 1 or 6 wherein:
said phase selecting means further comprises means responsive to the set values and inversions thereof and to the phase shifted versions and inversions thereof and is operative for supplying on a mutually exclusive basis the one of the phase shifted versions or inversions thereof.

12. A synchronizer as defined in claim 1 wherein:
the period of the output clock signal is an integer multiple of the period of the reference clock signal; and
said phase selecting means further comprises means responsive to the set values and inversions thereof and to the phase shifted versions and inversions thereof and is operative for supplying on a mutually exclusive basis the one of the phase shifted versions or inversions thereof from which the output clock signal is derived.

13. A synchronizer as defined in claim 12 further comprising:
means responsive to the selected one of the phase shifted versions or inversions thereof and operative for initiating the output clock signal within one period of the reference clock period after the occurrence of the asynchronous signal and for changing states of the output clock signal upon the occurrence of a predetermined number of cycles of the reference clock signal.

14. A synchronizer as defined in claim 13 wherein said means for initiating the output clock signal and for changing states of the output clock signal, further operatively maintains the output clock signal in one predetermined state during the first cycle of the output clock signal after initiation for a different predetermined number of cycles of the reference clock signal than said one state is maintained during subsequent cycles of the output clock signal.

15. A synchronizer as defined in claims 1 or 6 further comprising:
means receptive of the selected one of phase shifted versions or inversions thereof and operative for supplying the output clock signal at a predetermined frequency which is substantially less than the reference clock signal, the output clock signal supplying means creating a transition in the output clock signal substantially upon the occurrence of the asynchronous signal and thereafter supplying transitions of the output clock signal in coincidence with the transitions of the selected one of the phase shifted versions or inversions thereof.

16. A synchronizer as defined in claim 1 wherein:

said register means comprises a plurality of memory cell means, each memory cell means receiving one phase shifted version and being operative in response to the asynchronous signal to set a value therein corresponding to the state of the phase shifted version at the time of the occurrence of asynchronous signal, each memory cell means further being susceptible to supplying a metastable set value in response to the approximately simultaneous occurrences of a transition of the phase shifted version and the occurrence of the asynchronous signal; and said phase selecting means operatively determines the one phase shifted version from the values set in the register means other than those potentially metastable set values.

17. A synchronizer as defined in claim 16 further comprising:
means for supplying the output clock signal within one period of the reference clock signal after the occurrence of the asynchronous event signal.

18. A synchronizer as defined in claim 17 wherein no more than one set value is metastable at a time.

19. A synchronizer as defined in claim 17 wherein no more than two set values are metastable at a time.

20. A synchronizer as defined in claim 1 wherein:
said register means comprises a plurality of memory cell means, each memory cell means receiving one phase shifted version and being operative in response to the asynchronous signal to set a value therein corresponding to the state of the phase shifted version at the time of the occurrence of asynchronous signal, each memory cell means further being susceptible to supplying a metastable set value for a settling time in response to the approximately simultaneous occurrences of a transition of the phase shifted version and the occurrence of the asynchronous signal; and said phase selecting means operatively determines the one phase shifted version from the set values after a predetermined time delay which is greater than the settling time.

21. A synchronizer as defined in claim 20 wherein the settling time is less than the time delay between subsequent phase shifted versions.

22. A synchronizer as defined in claim 20 wherein the predetermined time delay is less than the time delay between subsequent phase shifted versions.

23. A synchronizer as defined in claim 22 wherein the predetermined time delay is constant.

24. A synchronizer as defined in claim 1, 2 or 3 further comprising:
means responsive to the selected one of the phase-shifted versions for deriving and supplying the output clock signal within one period of the reference clock signal after the occurrence of the asynchronous event signal.

25. A synchronizer as defined in claim 1, 2 or 3 further comprising:
means responsive to the selected one of the phase-shifted versions for deriving and supplying the output clock signal within a predetermined constant time delay.

26. A synchronizer as defined in claim 25 wherein the predetermined constant time delay is independent of the frequency of periodicity of the reference clock signal.

27. A synchronizer as defined in claim 25 wherein the predetermined constant time delay is independent of any phase relationship between the reference clock signal and the asynchronous signal.

28. A synchronizer as defined in claim 1, 2 or 3 further comprising:
means responsive to the selected one of the phase-shifted versions for deriving and supplying the output clock signal within a time delay which is independent of the frequency of periodicity of the reference clock signal.

29. A synchronizer as defined in claim 1, 2 or 3 further comprising:
means responsive to the selected one of the phase-shifted versions for deriving and supplying the output clock signal within a time delay which is independent of any phase relationship between the reference clock signal and the asynchronous signal.

30. A synchronizer as defined in claim 1, 2 or 3 wherein:
the output clock signal is the selected one of the phase-shifted versions, and
said means for selecting the one phase-shifted versions consists essentially of combinatorial logic elements.

31. A synchronizer as defined in claim 2 or 3 further comprising:
a plurality of memory cell means, each memory cell means receiving one phase-shifted version and being operative in response to a transition of the reference clock signal to set a value therein to the state of the phase-shifted version at the time of the occurrence of the transition of the reference clock signal, each memory cell means further being susceptible to supplying a metastable set value in response to the approximately simultaneous occurrences of a transition of the phase-shifted version and the occurrence of the asynchronous signal; and wherein:
said phase selecting means operatively selects one of the phase shifted versions from a majority of the set values supplied from the memory cell means.

32. A synchronizer as defined in claim 31 wherein the transition of the asynchronous signal is one of the rising edge or the falling edge of the asynchronous signal, and the one of the transitions of the asynchronous signal is selected by the previous state of the output signal.

33. A synchronizer as defined in claim 32 wherein:
the output signal is supplied within a predetermined constant time delay which is less than the time period of one period of the reference clock signal.

34. A synchronizer as defined in claim 1, 2 or 3 wherein:
the plurality of versions of the reference clock signal is an odd number.

35. A synchronizer as defined in claim 2 or 3 further comprising:
a plurality of memory cell means, each memory cell means receiving one phase shifted version and being operative in response to the asynchronous signal to set a value therein corresponding to the state of the phase shifted version at the time of the occurrence of asynchronous signal, each memory cell means further being susceptible to supplying a metastable set value in response to the approximately simultaneous occurrences of a transition of the phase shifted version and the occurrence of the asynchronous signal; and said phase selecting means operatively determines the one phase shifted version from the set values other than those potentially metastable set values.

36. A synchronizer as defined in claim 35 further comprising:
means for supplying the output clock signal within one period of the reference clock signal after the occurrence of the asynchronous event signal.

37. A synchronizer as defined in claim 36 wherein no more than one set value is metastable at a time.

38. A synchronizer as defined n claim 36 wherein no more than two set values are metastable at a time.

39. A synchronizer as defined in claim 2 or 3 further comprising:
a plurality of memory cell means, each memory cell means receiving one phase shifted version and being operative in response to the asynchronous signal to set a value therein corresponding to the state of the phase shifted version at the time of the occurrence of asynchronous signal, each memory cell means further being susceptible to supplying a metastable set value for a settling time in response to the approximately simultaneous occurrences of a transition of the phase shifted version and the occurrence of the asynchronous signal; and
said phase selecting means operatively determines the one phase shifted version from the set values after a predetermined time delay which is greater than the settling time.

40. A synchronizer as defined in claim 39 wherein the settling time is less than the time delay between subsequent phase shifted versions.

41. A synchronizer as defined in claim 39 wherein the predetermined time delay is less than the time delay between subsequent phase shifted versions.

42. A synchronizer as defined in claim 41 wherein the predetermined time delay is constant.

43. A synchronizer as defined in claim 1, 2 or 3 wherein:
the output clock signal is the selected one of the phase-shifted versions, and
said means for selecting the one phase-shifted versions comprises essentially only combinatorial logic elements.

44. A synchronizer as defined in claim 1 wherein:
wherein said register means comprises a plurality of memory cell means, each memory cell means receiving one phase-shifted version and being operative in response to a transition of the reference clock signal to set a value therein to the state of the phase-shifted version at the time of the occurrence of the transition of the reference clock signal, each memory cell means further being susceptible to supplying a metastable set value in response to the approximately simultaneous occurrences of a transition of a phase-shifted version and the occurrence of the asynchronous signal; and wherein:
said phase selecting means operatively selects one of the phase shifted versions from a majority of the set values supplied from the memory cell means.

45. A synchronizer as defined in claim 44 wherein transition of the asynchronous signal is one of the rising edge or the falling edge of the asynchronous signal.

46. A synchronizer as defined in claim 45 wherein the one of the transitions of the asynchronous signal is selected by the previous state of the output signal.

47. A synchronizer as defined in claims 45 or 46 wherein:
the output signal is supplied within a predetermined constant time delay which is less than the time period of one period of the reference clock signal.

48. A synchronizer as defined in claim 2 or 3 wherein:
a selected one of the phase shifted versions or inversions thereof is supplied as the output clock signal; and
said phase selecting means uniquely identifies the one of the phase shifted versions or inversions thereof which is supplied as the output clock signal.

49. A synchronizer as defined in claims 2 or 3 wherein:
said phase selecting means further comprises gating means receptive of the set values and operative for deriving on a mutually exclusive basis the one of the phase shifted versions or inversions thereof.

50. A synchronizer as defined in claim 49 wherein:
the gating means is also operative in response to inversions of the set values.

51. A synchronizer as defined in claim 50 wherein:
the gating means is also receptive of the phase shifted versions and the inversions thereof.

52. A synchronizer as defined in claim 50 further comprising:
second gating means in addition to the gating means first aforementioned; and wherein:
said first gating means is operative in response to the set values and inversions thereof and is operative to supply a selection control signal which uniquely identifies the one of the phase shifted versions or the inversions thereof; and
said second gating means is receptive of the phase shifted versions and inversions thereof and is operative in response to the selection control signal for supplying the selected one of the phase shifted versions or inversions thereof.

53. A synchronizer as defined in claims 2 or 3 wherein:
said phase selecting means further comprises means responsive to the set values and inversions thereof and to the phase shifted versions and inversions thereof and is operative for supplying on a mutually exclusive basis the one of the phase shifted versions or inversions thereof.

54. A synchronizer as defined in claim 2 or 3 wherein:
the period of the output clock signal is an integer multiple of the period of the reference clock signal; and
said phase selecting means further comprises means responsive to the set values and inversions thereof and to the phase shifted versions and inversions thereof and is operative for supplying on a mutually exclusive basis the one of the phase shifted versions or inversions thereof from which the output clock signal is derived.

55. A synchronizer as defined in claim 54 further comprising:
means responsive to the selected one of the phase shifted versions or inversions thereof and operative for initiating the output clock signal within one period of the reference clock period after the occurrence of the asynchronous signal and for changing states of the output clock signal upon the occurrence of a predetermined number of cycles of the reference clock signal.

56. A synchronizer as defined in claim 54 wherein said means for initiating the output clock signal and for changing states of the output clock signal, further operatively maintains the output clock signal in one predetermined state during the first cycle of the output clock signal after initiation for a different predetermined number of cycles of the reference clock signal than said one state is maintained during subsequent cycles of the output clock signal.

57. A synchronizer as defined in claims 2 or 3 further comprising:
means receptive of the selected one of phase shifted versions or inversions thereof and operative for supplying the output clock signal at a predetermined frequency which is substantially less than the reference clock signal, the output clock signal supplying means creating a transition in the output clock signal substantially upon the occurrence of the asynchronous signal and thereafter supplying transitions of the output clock signal in coincidence with the transitions of the selected one of the phase shifted versions or inversions thereof.

* * * * *